United States Patent
Althowiqeb

(10) Patent No.: US 11,131,144 B1
(45) Date of Patent: Sep. 28, 2021

(54) ROTARY DYNAMIC SYSTEM FOR DOWNHOLE ASSEMBLIES

(71) Applicant: Saudi Arabian Oil Company, Dhahran (SA)

(72) Inventor: Ibrahim Abdullah Althowiqeb, Dammam (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/838,872

(22) Filed: Apr. 2, 2020

(51) Int. Cl.
*E21B 4/00* (2006.01)
*E21B 4/04* (2006.01)
*E21B 44/00* (2006.01)
*E21B 47/13* (2012.01)
*E21B 37/00* (2006.01)

(52) U.S. Cl.
CPC .......... *E21B 4/003* (2013.01); *E21B 4/04* (2013.01); *E21B 44/005* (2013.01); *E21B 47/13* (2020.05); *E21B 37/00* (2013.01)

(58) Field of Classification Search
CPC ............................................... E21B 4/003
See application file for complete search history.

(56) References Cited

U.S. PATENT DOCUMENTS

| | | |
|---|---|---|
| 2,879,849 A | 3/1959 | Le Bus |
| 3,070,170 A | 12/1962 | Le Bus et al. |
| 3,109,501 A | 11/1963 | Pugh |
| 3,318,397 A | 5/1967 | Combes |
| 4,427,080 A | 1/1984 | Steiger |
| 4,438,822 A | 3/1984 | Russell |
| 4,464,269 A | 8/1984 | Walker et al. |
| 4,466,486 A | 8/1984 | Walker |
| 4,491,181 A | 1/1985 | Krol |
| 4,494,610 A | 1/1985 | Walker |
| 4,754,819 A | 7/1988 | Dellinger |
| 4,811,800 A | 3/1989 | Hill et al. |
| 5,234,055 A | 8/1993 | Cornette |
| 5,247,992 A | 9/1993 | Lockhart |
| 5,419,397 A | 5/1995 | Reynolds et al. |
| 6,148,917 A | 11/2000 | Brookey et al. |
| 6,575,239 B2 | 6/2003 | Allen |
| 6,845,818 B2 | 1/2005 | Tutuncu et al. |
| 6,984,611 B2 | 1/2006 | Kercheville et al. |
| 7,211,549 B2 | 5/2007 | Patel et al. |
| 7,618,925 B2 | 11/2009 | Patel et al. |

(Continued)

FOREIGN PATENT DOCUMENTS

| | | |
|---|---|---|
| CN | 1040653 A | 3/1990 |
| CN | 201746831 U | 2/2011 |

(Continued)

OTHER PUBLICATIONS

Invitation to Pay Additional Fees for PCT/IB2020/056974, 14 pages (mailed Jan. 14, 2021).

(Continued)

*Primary Examiner* — Kristyn A Hall
(74) *Attorney, Agent, or Firm* — Charles E. Lyon; Peter A. Flynn

(57) ABSTRACT

A rotary dynamic system includes: a drill pipe; a bearing coupled at a first axial end to the drill pipe; and an outer sleeve coupled to a second axial end of the bearing. The outer sleeve rotates independently of the drill pipe.

13 Claims, 12 Drawing Sheets

(56) References Cited

U.S. PATENT DOCUMENTS

| | | |
|---|---|---|
| 7,703,549 B2 | 4/2010 | Krepp et al. |
| 8,298,998 B2 | 10/2012 | Creasey |
| 8,336,645 B2 | 12/2012 | Robson et al. |
| 8,616,303 B2 | 12/2013 | Rupp et al. |
| 9,803,427 B1 * | 10/2017 | Cooley ................. E21B 10/573 |
| 2001/0016561 A1 | 8/2001 | Hayatdavoudi |
| 2005/0045386 A1 | 3/2005 | Appleton |
| 2005/0205251 A1 | 9/2005 | Tulloch et al. |
| 2009/0194337 A1 | 8/2009 | Indrupskiy et al. |
| 2009/0208295 A1 | 8/2009 | Kinert et al. |
| 2013/0146294 A1 | 6/2013 | Dupriest et al. |
| 2015/0144329 A1 | 5/2015 | Schultz et al. |
| 2019/0040693 A1 | 2/2019 | Smith et al. |
| 2019/0292897 A1 | 9/2019 | Costa de Oliveira et al. |
| 2019/0323311 A1 | 10/2019 | Al-Qasim et al. |
| 2020/0067247 A1 * | 2/2020 | He ........................ H01R 39/64 |
| 2020/0095834 A1 | 3/2020 | Allen et al. |
| 2021/0189803 A1 | 6/2021 | MacKay |

FOREIGN PATENT DOCUMENTS

| | | |
|---|---|---|
| EP | 0354716 A1 | 2/1990 |
| GB | 2 338 970 A | 1/2000 |
| GB | 2 520 957 A | 6/2015 |
| WO | WO-2003/050383 A1 | 6/2003 |
| WO | WO-2009/095794 A2 | 8/2009 |
| WO | WO-2013/066746 A1 | 5/2013 |
| WO | WO-2018/125096 A1 | 7/2018 |
| WO | WO-2019/209824 A1 | 10/2019 |

OTHER PUBLICATIONS

International Search Report for PCT/IB2020/056974, 8 pages (dated Mar. 11, 2021).

Written Opinion for PCT/IB2020/056974, 12 pages (dated Mar. 11, 2021).

* cited by examiner

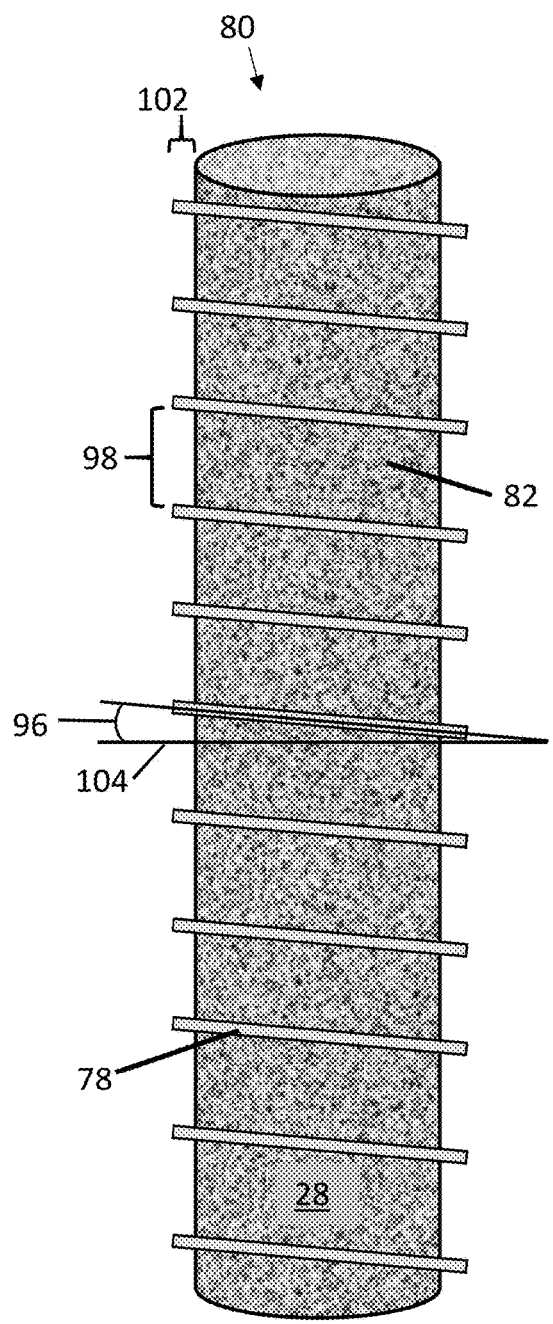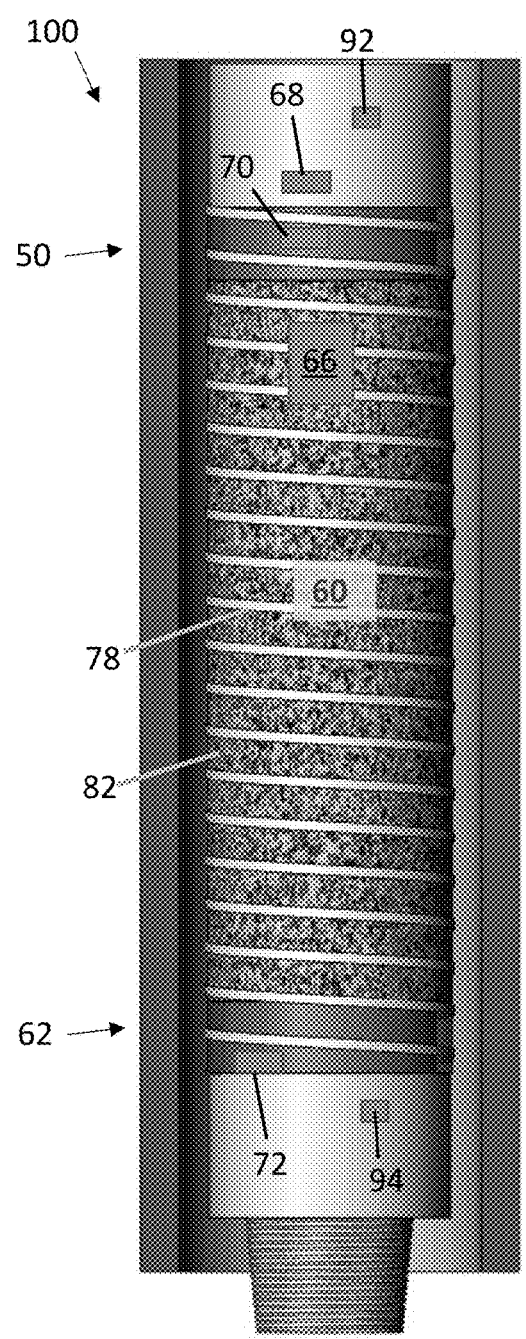
FIG. 12
FIG. 13

ROTARY DYNAMIC SYSTEM FOR DOWNHOLE ASSEMBLIES

FIELD

The subject matter described herein relates to apparatuses, methods, and systems for avoiding incidence of stuck pipes in downhole environments.

BACKGROUND

In drilling operations, stuck pipe events are considered to be undesirable incidents. Stuck pipes usually lead to delays and obstructions to operational activities, which often result in significant amount of lost time and incurred costs. Coinciding with the increased number of wells drilled by energy exploration companies each year, stuck pipe incidents consequently have been classified as one of the core challenge to overcome. During stuck pipe incidents, drillers are unable to rotate the drill pipe, nor are they able to move the drill pipe vertically upwards or downwards. Accordingly, millions (if not billions) of dollars are lost every year by companies due to stuck pipe incidents that have occurred during drilling operations.

One contributor to the incidence of stuck pipes is differential sticking, which typically occurs when high-contact forces caused by low reservoir pressures, high wellbore pressures, or both, are exerted over a sufficiently large area of the drill string. A force governing the sticking is a product of the differential pressure between the wellbore and the reservoir, and the area that the differential pressure is acting upon. A relatively low differential pressure applied over a large working area can be just as effective in sticking the pipe as can a high differential pressure applied over a small area. As time passes, if a drill string remains stationary, the area of contact can increase, making it more difficult to free the drill string. For example, the accumulation of consolidated drilling fluid such as drilling mud can form mud cakes which may solidify on the interior of a borehole (for example, on the inner surface of a borehole wall) as well as around the exterior of a drill pipe. When a drill pipe is stationary, the mud that is solidified on the borehole wall may "bridge" the gap between the borehole wall and the drill pipe, and then harden, thereby causing the drill string to become stuck. Another contributor to the incidence of stuck pipes is borehole "pack-off" which occurs when fragments, cuttings, and debris from the drilling process accumulate at the bottom of a borehole around the drill pipe, thereby causing friction and eventual sticking of the drill pipe within the borehole.

SUMMARY

The present disclosed embodiments include apparatuses, systems, and methods for helping drillers to minimize the occurrence of this stuck pipe events.

In one aspect of the present invention, a rotary dynamic system includes a drill pipe; a first bearing coupled at a first axial end to the drill pipe; and an outer sleeve coupled to a second axial end of the bearing. In some embodiments, the outer sleeve rotates independently of the drill pipe.

In some embodiments, at least a portion of the drill pipe is concentrically disposed within the outer sleeve.

In some embodiments, the rotary dynamic system further includes a second bearing. In some embodiments, the first bearing is couple to an axially top portion of the outer sleeve and the second bearing is coupled to an axially bottom portion of the outer sleeve.

In some embodiments, each of the first bearing and the second bearing includes one of a ball bearing, a roller bearing, a roller ball bearing, and a sleeve bearing. In some embodiments, the first bearing includes a different type of bearing than the second bearing.

In some embodiments, at least one of the first bearing and the second bearing is at least partially comprised of a ceramic material. In some embodiments, the ceramic material includes at least one of silicon nitride ($Si_2N_4$), alumina ceramic including an alumina purity range from about 75% to about 99%, and yttria-stabilized zirconia (YSZ).

In some embodiments, the first bearing includes a metallic ball bearing, and the second bearing includes a ceramic roller bearing.

In some embodiments, the outer sleeve is actively driven via at least one of an electric motor, at least one engagement mechanism coupling the outer sleeve to the drill pipe, and a plurality of one-way catches disposed between an inner race of the bearing and an outer race of the bearing.

In some embodiments, the rotary dynamic system further includes a sensor disposed on at least one of the outer sleeve, the bearing, and the drill pipe, and the sensor includes at least one of a strain gauge, a Hall sensor, and an RFID tag.

In some embodiments, the rotary dynamic system further includes multiple sensors disposed on at least one of the outer sleeve, the bearing, and the drill pipe. In some embodiments, the multiple sensors determine at least one of a rotational speed and a rotational location of the outer sleeve. In some embodiments, the metallic ball bearing is composed of at least one of carbon steel and austenitic steel. In some embodiments, at least a portion of the drill pipe is concentrically disposed within the outer sleeve.

In some embodiments, the rotary dynamic system further includes a cleaning solution unit including a container for holding a cleaning solution, a nozzle connected to the container for spraying the cleaning solution, and a nozzle gate for exposing the nozzle when necessary.

In some embodiments, the rotary dynamic system further includes at least one spiral notch deposited on the sleeve that wraps around the outer sleeve.

In another aspect, a downhole assembly includes an outer sleeve including a hollow cylindrical body; a drill pipe concentrically disposed within the outer sleeve; and at least one bearing coupled to both the outer sleeve and the drill pipe and allowing relative rotational movement therebetween. In some embodiments, the outer sleeve prevents deposits from accumulating on an outer surface of the drill pipe.

In some embodiments, the drill pipe is stationary while the outer sleeve rotates about the drill pipe. In some embodiments, the outer sleeve is stationary while the drill pipe rotates within the outer sleeve.

In some embodiments, at least one drilling fluid is circulated though both the drill pipe and an annulus of a borehole in which the downhole assembly is disposed. In some embodiments, the deposits include at least one of scaling, mineral deposits, hardened mud, and consolidated drilling fluid.

In another aspect, a method of reducing the incidence of stuck drill pipes includes: deploying a rotary dynamic system in a downhole environment, where the rotary dynamic system including a bearing, a first drill pipe coupled to a first end of the bearing, and an outer sleeve coupled to a second end of the bearing; initiating a drilling process; and stopping a drilling process. In some embodiments, stopping the drilling process includes stopping the first drill pipe from rotating while allowing the outer sleeve to continue to rotate.

In some embodiments, the method further includes determining an angular speed of the outer sleeve. In some embodiments, initiating a drill process includes rotating the first drill pipe and the outer sleeve, and circulating drilling fluid in the downhole environment.

In some embodiments, the method further includes accelerating the outer sleeve after determining an angular speed of the outer sleeve.

In some embodiments, the bearing further includes a first bearing coupled to a top axial end of the outer sleeve, and a second bearing coupled to the bottom axial end of the outer sleeve.

In some embodiments, the prior to accelerating the outer sleeve, the outer sleeve remains stationary for a predetermined period of time. In some embodiments, the predetermined period of time is from about thirty (30) seconds to about two (2) hours.

It should be understood that the order of steps or order for performing certain action is immaterial as long as the invention remains operable. Moreover, two or more steps or actions may be conducted simultaneously.

The following description is for illustration and exemplification of the disclosure only, and is not intended to limit the invention to the specific embodiments described.

The mention herein of any publication, for example, in the Background section, is not an admission that the publication serves as prior art with respect to any of the present claims. The Background section is presented for purposes of clarity and is not meant as a description of prior art with respect to any claim.

BRIEF DESCRIPTION OF THE DRAWINGS

A full and enabling disclosure of the present disclosed embodiments, including the best mode thereof, directed to one of ordinary skill in the art, is set forth in the specification, which makes reference to the appended Figs., in which:

FIG. 12 illustrates a side view of a helical reamer, according to aspects of the present embodiments;

FIG. 13 illustrates a side view of a helical reamer, according to aspects of the present embodiments;

DESCRIPTION OF CERTAIN EMBODIMENTS OF THE INVENTION

Figure 1:
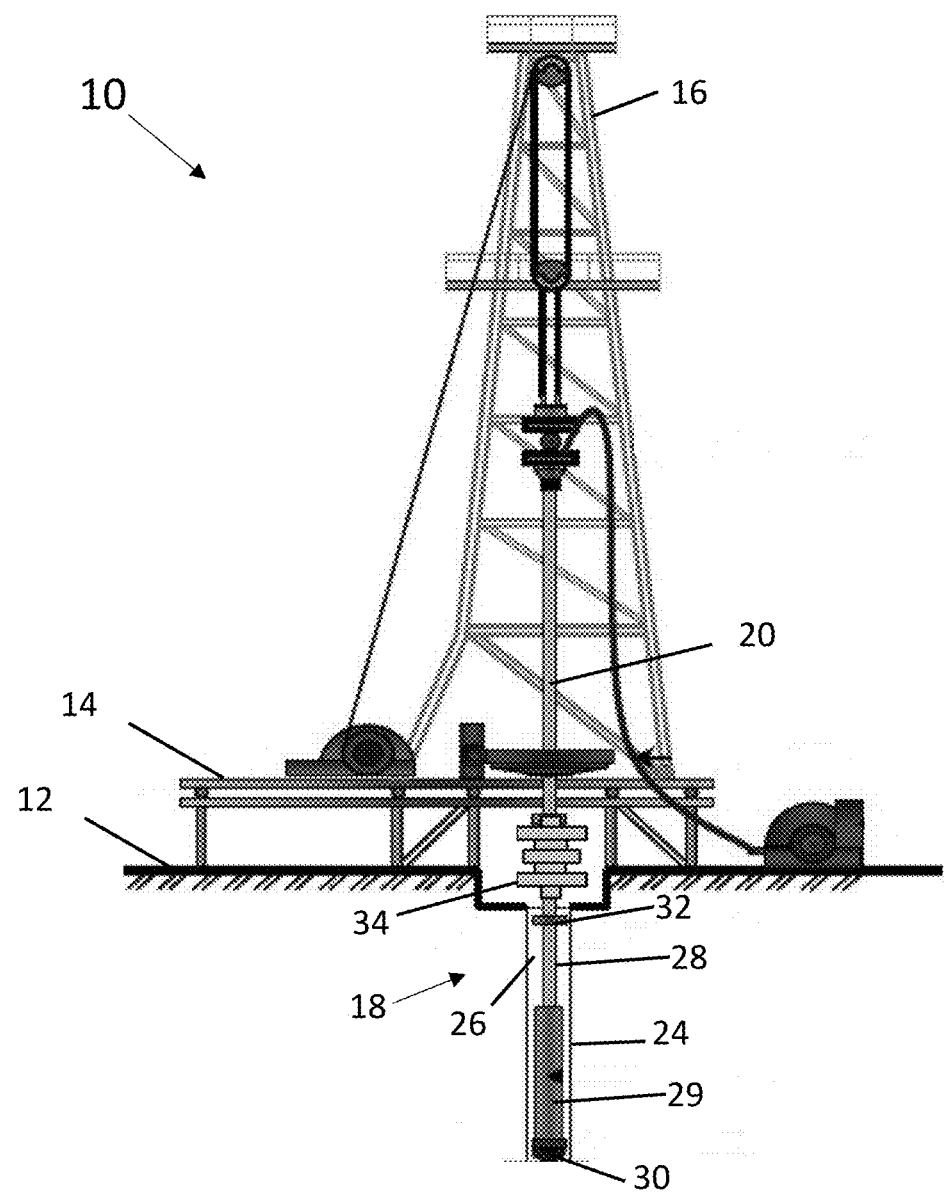
FIG. 1 illustrates a side view of an exemplary oil rig.

Reference will now be made in detail to the present disclosed embodiments, one or more examples of which are illustrated in the accompanying drawings. The detailed description uses numerical and/or letter designations to refer to features in the drawings. Like or similar designations in the drawings and description have been used to refer to like or similar parts of the present embodiments.

Rotary Dynamic System

The present disclosed embodiments include apparatuses, methods, and systems for avoiding stuck pipe and stuck drill string incidents during drilling operations. The apparatuses, methods, and systems use a rotary dynamic system (RDS) that can be attached around the outer diameter of the drill pipe, and that has the ability to rotate continuously, even when the drill string is stationary (for example, when an additional drill pipe is being added to the drill string). The rotary dynamic system may include "layers" that include an outer layer (or sleeve) as well as an inner layer or drill pipe, with the outer layer being rotatable around the inner layer (and the inner layer being rotatable within the outer layer). The rotary dynamic system may include one or more roller, ball, and/or sleeve bearings coupling the outer sleeve to the drill pipe. Roller bearings may include two rings: a first ring that couples to the drill pipe and a second ring that couples to the outer sleeve, with ball, roller, roller ball, or sleeve bearings disposed between the first and second rings, thereby allowing relative rotational motion therebetween.

FIG. 1 illustrates an exemplary oil rig 10, including a rig floor 14, elevated above the ground 12. Extending vertically upward from the rig floor 14 is a derrick 16 which includes a framework for supporting the oil rig 10. The oil rig 10 may include a drill pipe 28 that may be coupled via various components to a drill string. The drill string may be disposed in a borehole 18 that includes a borehole wall 24 disposed therewithin. The borehole 18 may include an annulus 26 defined by the ring-shaped space disposed radially outward of the drill string (and radially inward of the borehole wall 24). The drill string may include one or more drill collars 29, as well as one or more threaded connections 30 disposed at the bottom of the drill pipe 28. The oil rig 10 may also include a managed pressure drilling (MPD) system 32 including one or more rotating control devices (RCD) for maintaining the pressure within the borehole 18 while one or more pieces of equipment is rotating or operating. The oil rig 10 may also include a blow-out preventer (BOP) 34 for preventing blowouts or uncontrolled releases of hydrocarbons at the oil rig 10.

Figure 2:
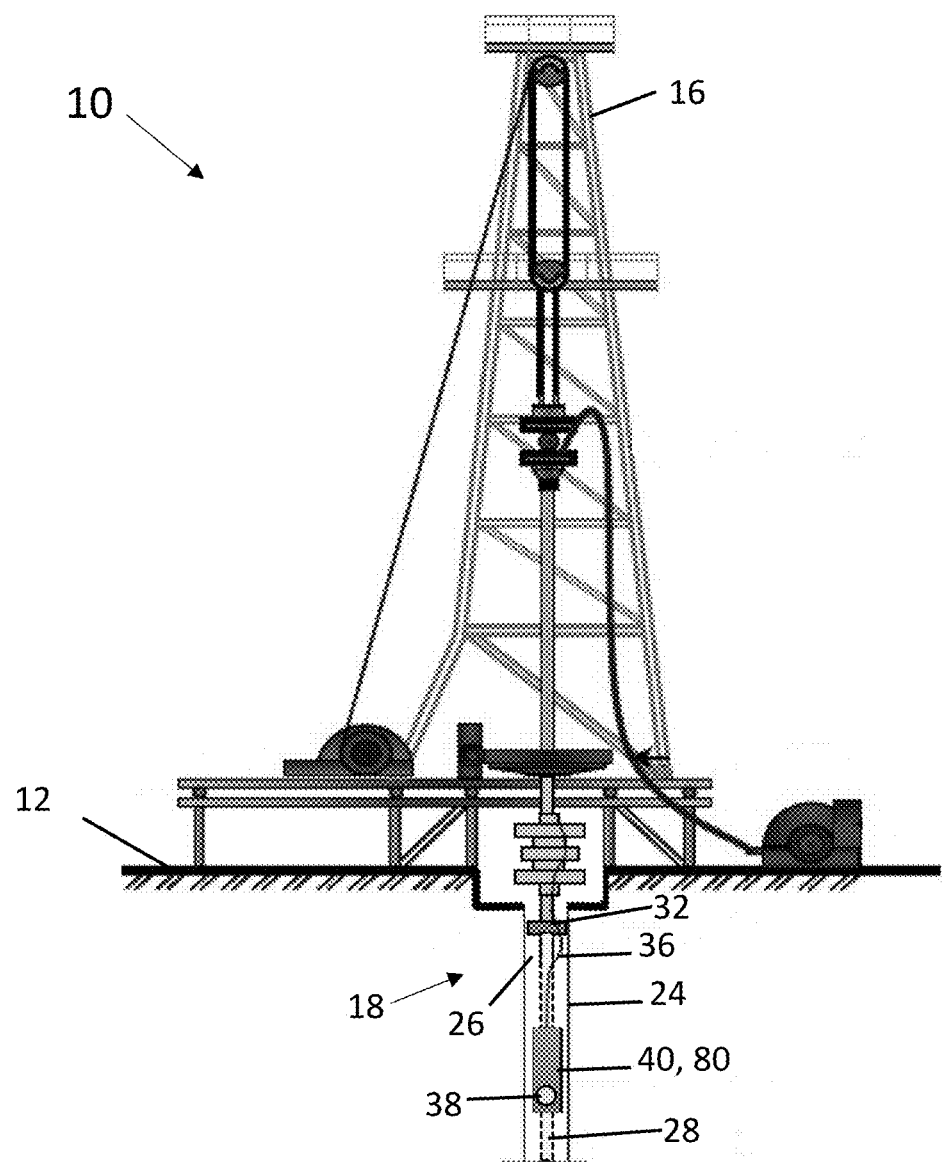
FIG. 2 illustrates a side view of an oil rig including a rotary dynamic system, according to aspects of the present disclosed embodiments.

FIG. 2 illustrates a side view of the oil rig 10, including a rotary dynamic system 40, according to aspects of the present disclosed embodiments. The oil rig 10 may include the derrick 16, the managed pressure drilling (MPD) system 32, the drill pipe 28, and the annulus 26. In the embodiment of FIG. 2, the oil rig 10 may include a rotary dynamic system 40 disposed within the annulus 26 defined between the drill pipe 28 and the borehole wall 24. The rotary dynamic system 40 may be concentric about (that is, rather than adjacent to) the drill pipe 28. The rotary dynamic system 40 may include at least one sensor 38 disposed along (or within) an outer surface or sleeve 60 (shown in FIG. 5) of the rotary dynamic system 40, as well as a wireline 36 that may electrically and/or operatively couple the rotary dynamic system 40 and sensor 38 to one or more respective power sources and/or control systems located at the surface 12, within the borehole 18, or at a remote location. The rotary dynamic system 40, as illustrated in FIG. 2, may not necessarily be geometrically to scale relative to other components such as the borehole 18 and the drill pipe 28. For example, the rotary dynamic system 40 may include an outer diameter that is about the same as the outer diameter of a standard drill pipe 28, or in other embodiments, that is about one (1) percent, about three (3) percent, about five (5) percent, about eight (8) percent, about twelve (12) percent, about eighteen (18) percent, about twenty-five (25) percent, about forty (40) percent, or about sixty (60) percent greater than the outer diameter of a standard drill pipe 28.

Referring still to FIG. 2, in operation, the rotary dynamic system 40 may freely spin about the drill pipe 28 such that while the drill pipe 28 is stationary, the rotary dynamic system 40 may continue to spin, thereby preventing the hardened mud from caking on the drill pipe 28 and causing it to get stuck. Stated otherwise, the rotary dynamic system 40 may rotate independent of the drill pipe 28 such that the drill string does not become stuck, even while the drill string is stationary.

Figure 3:
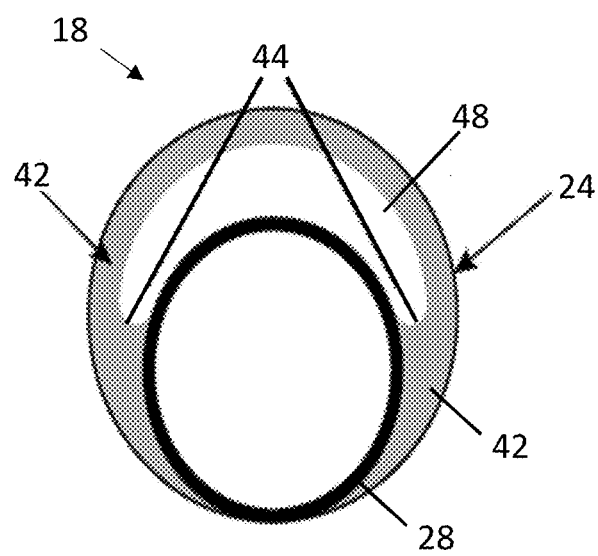
FIG. 3 illustrates a top view of an exemplary drill pipe within a borehole.

FIG. 3 illustrates a top schematic view of a conventional drill pipe 28 disposed within a borehole 18. The borehole wall 24 may define a physical outer boundary of the borehole 18, and may become caked with mud 42 and other consolidated drilling fluid and/or downhole debris. The mud cake 42 accumulates around the interior of the borehole wall 24 (inner wall of the borehole 18), and when the drill pipe 28 is stationary the mud cake 42 may bridge from the borehole wall 24 across a gap 48 (or annulus) to the drill pipe 28. The mud bridging 44 may then solidify and cause the drill pipe 28 to couple to the borehole wall 24, thereby preventing the drill pipe 28 from being easily rotated. In situations in which the drill pipe 28 is not concentric within the borehole 18, bridging 44 may occur more easily since the gap 48 between the drill pipe 28 and the nearest surface of the borehole wall 24 is decreased (that is, when compared to situations in which the drill pipe 28 is concentric within the borehole 18). The drill pipe 28 does not to be fully encased in mud 42 to become stuck. For example, in the embodiment of FIG. 3, the bridging 44 extends around about 60% of the outer circumference of the drill string or drill pipe 28. In other embodiments in which a drill pipe 28 becomes stuck, the bridging 44 may extend around from about 5% to about 100%, or from about 10% to about 60%, or from about 15% to about 40%, or from about 20% to about 30% of the outer circumference of the drill pipe 28.

Figure 4:
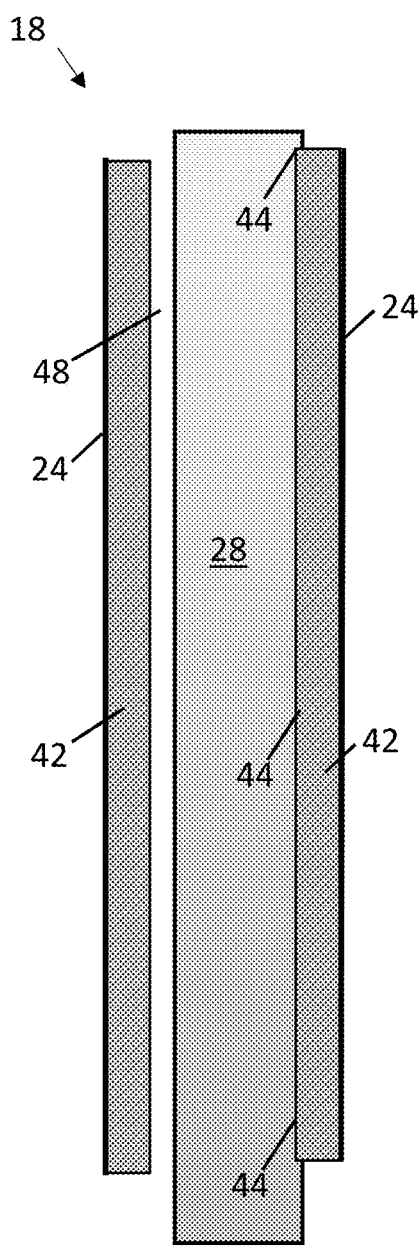
FIG. 4 illustrates a side view of an exemplary drill pipe within a borehole.

FIG. 4 illustrates a side schematic view of a conventional drill pipe 28 disposed within a borehole 18, including mud 42 caked or encased around the borehole wall 24. In the embodiment of FIG. 4, a radial gap 48 may be disposed between a portion of the drill pipe 28 and the borehole wall 24. In addition, bridging 44 may partially encase (and overlap with, in the side view of FIG. 4) the drill pipe 28. As discussed above, even if there are one or more radial gaps 48 between portions of the drill pipe 28 and the mud 42, a partially encased drill pipe 28 may still become stuck. Stated otherwise, the bridging 44 may extend around only a portion of the outer circumference of the drill pipe 28 and still cause a drill pipe 28 to become stuck.

Figure 5:
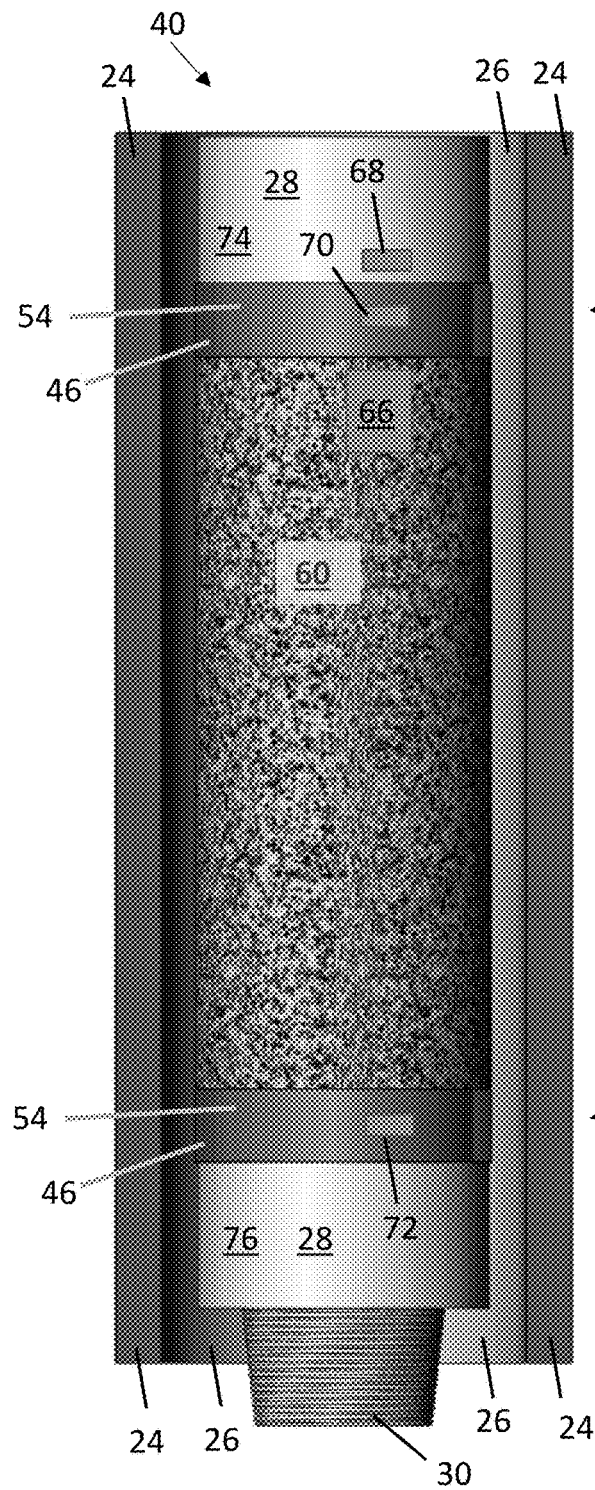
FIG. 5 illustrates a side view of a rotary dynamic system, according to aspects of the present disclosed embodiments.

FIG. 5 illustrates a side view of a rotary dynamic system 40, according to aspects of the present disclosed embodiments. The rotary dynamic system 40 may include multiple components coupled to or around a drill pipe 28 or drill string, or other downhole assemblies and components. The rotary dynamic system 40 may generally include at least one outer sleeve 60 concentrically disposed around the drill pipe 28, with at least one bearing 50, 62 coupling the outer sleeve 60 to the drill pipe 28 such that the outer sleeve 60 may rotate about the drill pipe 28. In one or more embodiments, the rotary dynamic system 40 may include a first bearing 50 disposed at the top of the rotary dynamic system 40, as well as a second bearing 62 disposed at the bottom of the rotary dynamic system 40. The first bearing 50 may be coupled to a top end of the outer sleeve 60 while a second bearing 62 may be coupled to a bottom end of the outer sleeve 60. As such, each of the first and second bearings 50, 62 allow the outer sleeve 60 to rotate about the drill pipe 28.

Referring still to FIG. 5, one or more threaded connections 30 may be disposed at the bottom of the drill pipe 28 that is carrying the rotary dynamic system or layer 40 for connecting the other drill pipes 28. The other drill pipes may be located under the rotary dynamic system. The other drill pipe may be connected to the last part of the drill string which is a bottom hole assembly (BHA) or another downhole component. As illustrated in FIG. 5, the rotary dynamic system (RDS) 40 may be disposed concentrically (or eccentrically) within the borehole wall 24 or within an annulus 26 (that is, a ring-shaped space) disposed radially outward of the RDS 40 and radially attached inward around the drill pipe 28. Each of the first and second bearings 50, 62 of the RDS 40 may also include an inner race 54 and an outer race 46 for holding components of each bearing 50, 62 (for example, balls, rollers, et cetera). In other embodiments, the RDS 40 may include a top drill pipe 74 coupled via the first bearing 50 to the outer sleeve 60 which is coupled to a bottom drill pipe 76 (and or other downhole component such as a bottom hole assembly (BHA) 76) via the second bearing 62. In such embodiments, the drill string or drill pipe 28 may not be disposed within the outer sleeve 60. Instead, when the drill string becomes stationary (for example, to add or remove a drill pipe from the drill string), the outer sleeve 60 may continue to rotate via the first bearing 50 such that bridging 44 of the mud cake 42 does not occur on the outer sleeve 60. The bottom hole assembly and/or bottom drill pipe 76 may also rotate or remain stationary, independent of the outer sleeve 60 due to the presence of the second bearing 62 which couples the outer sleeve 60 to the bottom hole assembly and/or bottom drill pipe 76. Each bearing 50, 62 may be affixed to the drill pipe 28 via two attachment connections. The bearings may work simultaneously for rotating the outer sleeve 60.

Figure 6:
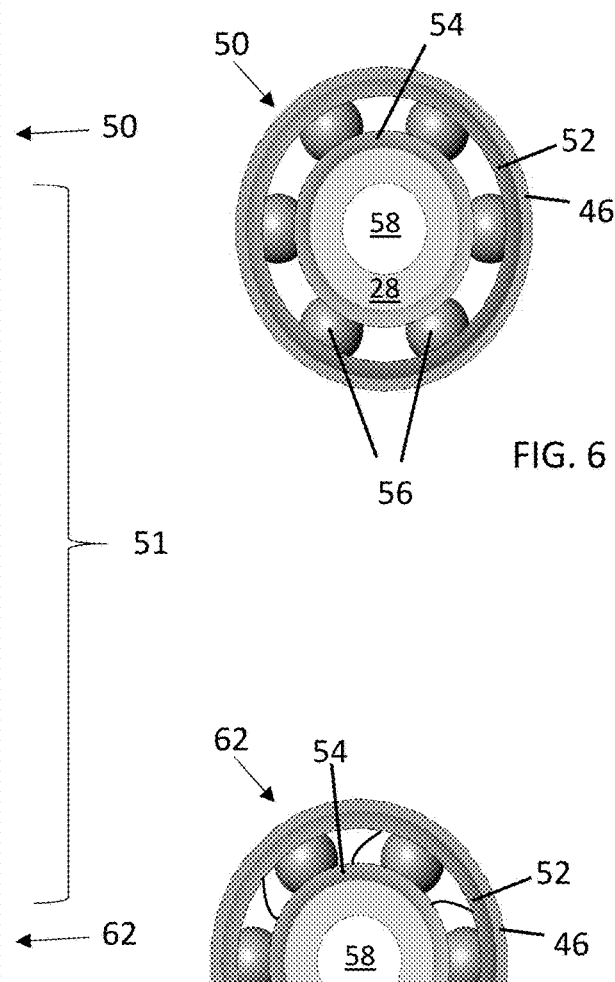
FIG. 6 illustrates a top view of a bearing assembly, according to aspects of the present disclosed embodiments.
Figure 7:
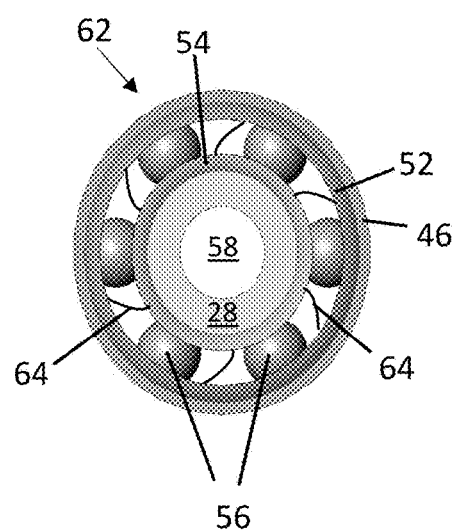
FIG. 7 illustrates a top view of a bearing assembly, according to aspects of the present disclosed embodiments.

FIGS. 6 and 7 illustrate top views of the first and second bearings 50, 62 respectively. Each of the first and second bearing 50, 62 may include an inner race 54 that is coupled to the drill pipe 28 circumferentially surrounding the drill pipe 28. The inner race 54, which may generally include a ring-shaped geometry, may be coupled to the drill pipe 28 via compression fit, epoxy, adhesion, welding, brazing, and/or other suitable means. In addition, the inner race 54 may be formed integrally with the drill pipe 28 (such that the inner race 54 and drill pipe 28 form a single, solitary, or monolithic component). The inner race 54 may include one or more radial grooves (not shown) circumferentially extending around the exterior of the inner race 54 such that one or more balls 56 may roll within the radial grooves (which extend radially inwardly from the outer surface of the inner race 54). In other embodiments, the inner race 54 may include rails extending circumferentially along each axial edge of the inner race 54 in place of (or in addition to) the radial grooves, thereby allowing the one or more balls 56 to roll therewithin. Each of the first and second bearings 50, 62 may also include outer rails 52 extending circumferentially around each bearing, radially outward of the one or more balls 56. The outer rails 52 may include a first outer rail at a first axial end of the bearing 50, 62 and a second outer rail disposed at a second axial end of each bearing 50, 62. The first and second bearings 50, 62 may also include an outer race 46 radially outward of the outer rails 52. The outer rails 52 and the outer race 46 exert axial (both downward and upward) and radially inward forces, respectively, on the one or more balls 56 while the inner race 54 (including the radial groove and/or the inner rails) exerts axial (both upward and downward) and radially outward forces on the one or more balls 56. As such, the one or more balls 56 may freely move circumferentially around the first and second bearings 50, 62, without moving radially or axially. The first and second bearings therefore allow the outer sleeve 60 to transfer radial and axial forces to the drill pipe 28 (and vice versa) while simultaneously allowing the outer sleeve 60 to rotate freely (that is, in a circumferential direction) around the drill pipe 28.

Referring still to FIGS. 6 and 7, the first and second bearings 50, 62 may include one or more balls 56 which may be generally spherically shaped. Each of the first and second bearings 50, 62 may include from about six (6) balls to about thirty (30) balls, or from about eight (8) balls to about twenty-five (25) balls, or from about ten (10) balls to about twenty (20) balls, or from about twelve (12) balls to about eighteen (18) balls, or from about fourteen (14) balls to about sixteen (16) balls. Each of the first and second bearings 50, 62 may include spacers disposed between each ball 56 such that the one or more balls 56 do not contact each other. The spacer configuration may include rings joined by linkages, with each ring extending around the circumference of a ball 56 such that the ball 56 may role within the ring. Stated otherwise, the spacer configuration may be describes as -o-o-o-o-o-o-o-o- with each "-" representing a linkage and each "o" representing a ring that extends around a circumference of a ball 56, holding the ball 56 while also allowing it to rotate therewithin.

Still referring to FIGS. 6 and 7, each of the first and second bearings 50, 62 may include roller bearings instead of the ball bearings. Roller bearings may include cylindrical rollers in place of the balls 56 of the ball bearings. Similar to ball bearings, the cylindrical rollers of roller bearings may be disposed radially inward of an outer race 46 and radially outward of an inner race 54. In addition, roller bearings may include one or more sets of rails on the inner and/or outer races 54, 46 to axially contain and/or constrain the cylindrical rollers. Each of the cylindrical rollers of the roller bearings may be rotatably mounted on an axle that is disposed between the one or more sets of rails on the inner and/or outer races 54, 46. Each axle may be oriented axially (for example, parallel to a centerline of the borehole 18 and/or drill pipe 28). Each roller bearing may contain between about six (6) and about fifty (50) rollers (or sets of rollers), including all sub-ranges therebetween. Roller ball bearings, which include alternating balls 56 (spherical geometry) and rollers (cylindrical geometry) circumferentially spaced around the bearing between the inner and outer races 54, 46 may also be used. Sleeve bearings (which include concentric cylinders with a predetermined space or tolerance defined between the outer circumference of the inner cylinder and the inner circumference of the outer cylinder) may also be used.

Referring to FIGS. 5-7, the rotary dynamic system 40 may include first and second bearings 50, 62 that include ball bearings, roller bearings, roller ball bearings, and/or sleeve bearings. Roller bearings may generally be able to accommodate higher stresses than ball bearings since each of the rollers contacts the inner and/or outer races 54, 46 along a contact line whereas each ball in a ball bearing contacts the inner and/or outer races 54, 46 along a single contact point. On the other hand, ball bearings may include lower operational friction, thereby allowing ball bearings to operate with less mechanical losses. Sleeve bearings may accommodate both rotational (that is, circumferential) and axial movement between the inner and outer cylinders while ball bearings, roller bearings, and ball roller bearings allow only rotational (that is, circumferential) movement between the outer sleeve 60 and drill pipe 28. Because different types of bearings include various advantageous and disadvantages, the rotary dynamic system (RDS) 40 may include multiple types of bearings. For example, in one embodiment, the RDS 40 may include a first bearing 50 disposed at the top of the outer sleeve 60 and a second bearing 62 disposed at the bottom of the outer sleeve 60, where the first bearing 50 is a ball bearing and the second bearing 62 (disposed near areas of potentially greater stresses) is a roller bearing. In other embodiments, the RDS 40 may include a first bearing 50 that is a sleeve bearing and a second bearing 62 that is a roller bearing. In other embodiments, the RDS 40 may include a first bearing 50 that is a ball bearing and a second bearing 62 that is a sleeve bearing. In other embodiments, the RDS 40 may include a first bearing 50 that is a roller ball bearing and a second bearing 62 that is either a roller ball bearing or a sleeve bearing. In other embodiments, the RDS 40 may include a first bearing 50 that is a roller ball bearing, a ball bearing or a sleeve bearing, as well as a second bearing 62 that is either a roller bearing, a ball bearing, or a sleeve bearing. The RDS 40 may also include an outer sleeve 60 and drill pipe 28 that are dimensioned such that the two components act as a sleeve bearing (allowing circumferential and axial movement therebetween), even in the absence of other bearings 50, 62. As such, in some embodiments of the RDS 40 that include the first and second bearings 50, 62, the outer sleeve 60 and drill pipe 28 may act as a third bearing. The RDS 40 may include one (1), two (2), three (3), four (4), or more bearings 50, 62.

Referring still to FIGS. 5-7, each of the bearings 50, 62 may be composed of metallic materials such as steel, stainless steel, carbon steel, austenitic steel, galvanized steel, titanium, aluminum, and/or other suitable metals and metallic alloys. In addition, each of the bearings 50, 62 may be composed of ceramic materials such as ceramic silicon nitride (Si2N4) as well as others such as alumina ceramic (for example, with an alumina purity range from about 75% to about 99%, from about 80% to about 95%, or from about 85% to about 96%), steatite ceramic, zirconia ceramic (for example zirconium dioxide and/or yttria-stabilized zirconia (YSZ), silicon carbide ceramic, cordierite ceramic, mullite ceramic, and other ceramic materials). Roller bearings, ball bearings, roller ball bearings, sleeve bearings, and other types of bearings may be composed entirely of one or more ceramic materials, and may also be partially composed of ceramic materials (for example, the inner and outer races 54, 46 and spacers) and partially composed of metal (for example, the balls and rollers). Ceramic bearings may have the benefit of being more stress and strain resistant (that is, capable of withstanding higher stresses) and may also include lower operational friction. However, ceramic bearings may also be more expensive. Therefore, it may be pragmatic to judiciously include ceramic bearings in the RDS 40. In some embodiments, the RDS 40 may include a first bearing 50 that is metallic and a second bearing that is ceramic and/or partially ceramic. Each of the bearings 50, 62 described herein including ball bearings, roller bearings, roller ball bearings, sleeve bearings, metallic bearings, ceramic bearings, and hybrid bearings (that is, partially metallic and partially ceramic) may use oil, air, and/or other fluids as lubricating fluids.

Still referring to FIGS. 5-7, each of the first and second bearings 50, 62 may include one or more one-way catches 64 (shown in FIG. 7). The one or more one-way catches 64 may be circumferentially spaced around each bearing extending from the inner race 54 toward the outer race 46. In one embodiment, the one or more one-way catches 64 may be spaced circumferentially around the bearing 50, 62 such that they alternate with the balls 56. In other embodiments, the one-way catches 64 may be located at different axial locations than the balls 64 (or rollers) such that the balls 56 or rollers may pass by the one-way catches 64 while the RDS 40 is rotating. For example, in one embodiment, the one-way catches 64 may extend between the inner rails (disposed in the inner race 54) and outer rails 52. Each one-way catch 64 may be coupled to the inner race 54 and may contact (but not be coupled to) the outer race 46 or outer rails 52. The one-way catches 64 may be contoured (for example, with a concavity or concave surface oriented toward the direction of rotation of the drill pipe 28 (clockwise in the embodiment of FIG. 7; counterclockwise in other embodiments)) such that as the drill pipe 28 rotates, the one-way catches 64 contact the outer race 46 (or outer rails 52), thereby pushing the outer race 46 so that it rotates as well (along with the outer sleeve 60).

Referring still to FIGS. 5-7, in some embodiments, the outer race 46 and/or the outer rails 52 may include notches or grooves that may interface with the one-way catches 64 when the drill pipe 28 is rotating. Due to the contouring of the one-way catches 64 and the ability of the one-way catches 64 to flex, as the drill pipe stops rotating, the outer race 46 and outer rails 52 may pass by the one-way catches 64 (allowing the outer race 46 and outer sleeve 60 to keep rotating). As such, the outer sleeve 60 may rotate any time the drill pipe 28 is rotating, but may continue to rotate (at least for a period of time) even when the drill pipe 28 stops rotating due to the inertial (that is, the rotational momentum) of the outer sleeve 60. In the embodiment of FIG. 7, the bearing 62 comprises six (6) one-way catches 64 circumferentially spaced around the bearing 62 about sixty (60) degrees apart. In other embodiments, each of the first and second bearings 50, 62 may include other numbers and spacing arrangements of one-way catches 64.

Referring still to FIGS. 5-7, in other embodiments, each of the first and second bearings 50, 62 may include one or more engagement or lock mechanisms in place of or in addition to the one-way catches 64. The engagement or lock mechanisms (not shown) may be used to selectively allow the drill pipe 28 to couple to or decouple from the outer sleeve 60 such that the drill pipe 28 and outer sleeve 60 may selectively rotate together or independently of one another. Any suitable means may be used as the engagement or lock mechanism including (but not limited to) latches, clutches, splines or teeth, threading, pin connections (and accompanying pin holes), interference fits, gears, as well as other suitable devices. In other embodiments, the RDS 40 may include motor windings and/or permanent magnets disposed within the outer sleeve 60, the first and/or second bearings 50, 62, and/or the drill pipe 28 such that the outer sleeve 60 may be selectively caused to rotate even while the drill pipe 28 is stationary by electrifying the windings via the wireline 36. As such, the outer sleeve 60 and the drill pipe 28 may act as a motor (or generator) rotor-stator system. In other embodiments, the RDS 40 may include one-way catches 64, a motor rotor-stator system, and/or one or more engagement or lock mechanisms. In other embodiments, the RDS 40 may not include one-way catches 64, a motor rotor-stator system, and/or any engagement or lock mechanisms. The drill pipe 28 may include a through-bore 58 that may be used to circulate drilling fluids such as water, drilling mud, acidizing solution and other fluids while the drill is in operation (that is, while the drill pipe is rotating).

Still referring to FIGS. 5-7, the rotary dynamic system (RDS) 40 may include one or more sensors disposed on the outer sleeve 60 (for example, first sensor 66), on the drill pipe 28 (for example, second sensor 68), and/or on the bearings 50, 62 (for example, third and fourth sensors 70, 72). The first, second, third, and fourth sensors 66, 68, 70, 72 may include electronic transmitters, receivers, and/or transceivers, RFID tags and receivers, proximity sensors, strain gauges, Hall sensors, temperature probes, static pressure transmitters, differential pressure transmitters, moisture sensors, accelerometers, and other types of sensors. The first, second, third, and fourth sensors 66, 68, 70, 72 may be used to detect the speed (for example, the rotational or angular speed) of the outer sleeve 60 and/or the drill pipe 28 on an absolute basis or relative to one another. The first, second, third, and fourth sensors 66, 68, 70, 72 may also be used to sense the presence of moisture, environmental conditions (such as pressure and temperature), as well as the axial, circumferential, and/or radial position of the outer sleeve 60 (for example, using the proximity probes or Hall sensors). Data from the first, second, third, and/or fourth sensors 66, 68, 70, 72 may be transmitted to a control system (either wirelessly or via the wireline 36) and used in the operations of the RDS 40. The first, second, third, and fourth sensors 66, 68, 70, 72 may also be used to sense the accumulation of mud, scaling, moisture, and other materials (illustrated in FIG. 5) on the outer sleeve 60. In the embodiment of FIG. 5, deposits are illustrated as having accumulated on the outer surface of the outer sleeve 60. The deposits may include scaling, mineral deposits, hardened mud, and/or consolidated drilling fluid.

Referring to FIG. 5, in an alternate configuration, the first and second bearings 50, 62 may be internal to a center portion 51 of the drill pipe 28, rather than longitudinally above and below the drill pipe 28, according to aspects of the present disclosed embodiments. In such embodiments, portions of the center portion 51 may act as the outer race 46 of the first and second bearings 50, 62. In some embodiments, the drill pipe 28 may act as the inner race 54 of each of the first and second bearings 50, 62. In such embodiments, the portion of the drill pipe 28 acting as the inner race 54 of the first and second bearings 50, 62 may have a smaller outer diameter than the remainder of the drill pipe 28. The drill pipe 28 that includes a drill segment or tool joint may present from about 30 to about 33 feet in length, or from about nine (9) to about eleven (11) meters, or from about eight (8) to about twelve (12) meters in length. The illustrations disclosed herein may not necessarily be to scale.

Figure 8:
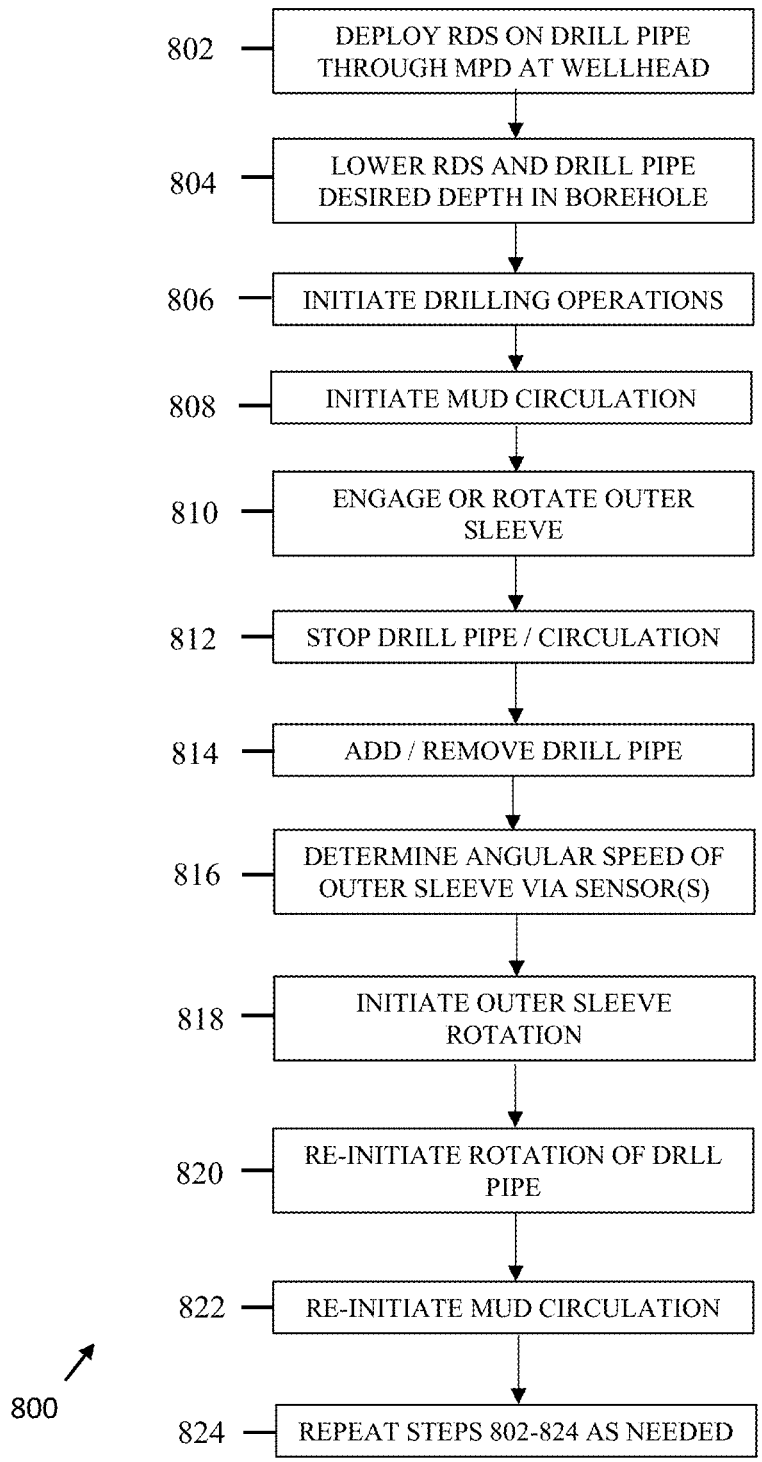
FIG. 8 illustrates a schematic of a method of preventing the incidence of stuck pipes, according to aspects of the present disclosed embodiments.

FIG. 8 illustrates a method 800 of preventing or reducing the incidence of stuck pipes using the rotary dynamic system (RDS) 40, according to aspects of the present disclosed embodiments. At step 802, the method 800 may include deploying the RDS 40 (and accompanying drill pipe 28) through a managed pressure drilling (MPD) system 32 or component thereof (for example, through a lubricator) at or near the wellhead or surface of the borehole 18. At step 804, the method 800 may include lowering the RDS 40 and drill pipe 28 to a desired depth (for example, for drilling purposes) within the borehole 18. At step 806, the method 800 may include initiating drilling operations which may include rotating the drill string or drill pipe 28, as well as initiating the circulation of mud (at step 808) through the center bore or through-bore 58 of the drill pipe. At step 810, the method 800 may include engaging or rotating the outer sleeve 60. The outer sleeve 60 may be rotated via the one-way catches 64, via one or more locking or engagement mechanisms, via an electrical motor (integrated into the RDS 40), and/or via the inherent friction in the RDS 40 (for example, as the drill pipe 28 and inner race 54 rotate (driven by a rotary table or top drive system (TDS)), the balls 56 or rollers begin to rotate which gradually accelerates the outer sleeve 60). As such, the outer sleeve 60 may rotate as the drill pipe 28 rotates, even in the absence of a device or system that is actively driving or rotating the outer sleeve 60. Step 810 may occur before steps 806, and 808, and even before steps 802 and 804.

Referring still to FIG. 8, at step 812, the method 800 may include stopping the drill pipe 28 from rotating and stopping the circulation of mud and/or drilling fluid (for example, if a new drill pipe needs to be added or removed from the drill string). Prior to step 812, the method 800 may include disengaging the outer sleeve 60 from the drill pipe 28 such that the outer sleeve 60 may continue to rotate freely (for example, due to inertia) about the drill pipe 28. In other embodiments, the outer sleeve 60 may be actively driven (for example, by a motor) after the drill pipe 28 becomes stationary. At step 814, the method 800 may include adding or removing a drill pipe 28 from the drill string. At step 816, the method 800 may include determining an angular speed of the outer sleeve via the first, second, third, and/or fourth sensors 66, 68, 70, 72 in order to determine if an action should be taken to accelerate the outer sleeve 60 (for example, if the outer sleeve 60 has decelerated or become stationary). In one embodiment, a timer may be initiated when the outer sleeve 60 becomes stationary so as to provide a timeframe for which the mud hardening may occur (such that mud hardening (and a resulting stuck pipe) may be avoided). If the outer sleeve 60 has been stationary for a predetermined period of time, the control system and/or operator may command the RDS 40 to accelerate the drill pipe 28 and/or outer sleeve 60 so as to avoid or reduce the likelihood of a stuck pipe incidence.

In some embodiments, the outer sleeve 60 of the RDS 40 may include a cleaning solution unit including a nozzle (not shown) for spraying a cleaning solution, a container (not shown) for the cleaning solution, and a nozzle gate (not shown). For example, the cleaning solution may prevent the mud cake and/or assist the removal of the mud cake. In some embodiments, the cleaning solution may include acid. When necessary, the nozzle gate may open and the nozzle may spray the cleaning solution stored in the container. In some embodiments, the outer sleeve 60 of the RDS 40 may include a sensor (for example, an optical sensor, a moisture sensor, a touch sensor, and/or other types of sensors) to determine whether the cleaning solution should be sprayed. The sensor may activate the opening of the nozzle gate and the spraying action of the nozzle remotely. In some embodiments, the cleaning solution unit may be located on the outer surface of the outer sleeve 60. The nozzle and the container may be embedded in the outer sleeve 60, so that the nozzle does not protrude from the outer sleeve 60. For example, only a tip of the nozzle may be exposed when the nozzle gate is open. In some embodiments, the outer sleeve 60 may include a plurality of cleaning units. The cleaning units may be distributed throughout the entire outer sleeve 60. The cleaning units may be spaced evenly. In some embodiments, the container may be connected to two or more nozzles.

Still referring to FIG. 8, at step 818, the method 800 may include initiating (or re-initiating) a rotation of the outer sleeve 60 (for example, if the outer sleeve 60 has stopped rotating due to friction). At step 818, the method 800 may also include rotationally accelerating the outer sleeve in situations in which the outer sleeve 60 has decelerated but has yet to fully stop rotating. At step 820, the method 800 may include re-initiating the rotation of the drill pipe 28. At step 822, the method 800 may include re-initiating the circulation of mud or drilling fluid through the drill pipe 28. At step 824, the method 800 may include repeating any of steps 802-822 as needed to avoid allowing the drill pipe 28 and/or outer sleeve 60 from remaining stationary for more than a predetermined length of time. In some embodiments, the predetermined length of time may be from about thirty (30) seconds to about two (2) hours, or from about one (1) minute to about one-hundred (100) minutes, or from about two (2) minutes to about eighty (80) minutes, or from about three (3) minutes to about sixty (60) minutes, or from about four (4) minutes to about forty (40) minutes, or from about five (5) minutes to about thirty (30) minutes, or from about seven (7) minutes to about twenty-five (25) minutes, or from about ten (10) minutes to about twenty (20) minutes, or from about thirteen (13) minutes to about seventeen (17) minutes. The method 800 may include performing any of steps 802-824 in a different order than what is shown in FIG. 8, as well as omitting and/or repeating any of 802-824. In addition, one or more steps of method 800 may be performed concurrently with at least one other step of method 800.

In one mode of operation of the rotary dynamic system (RDS) 40, the drill pipe 28 may be stationary while the outer sleeve 60 rotates. In another mode of operation, the outer sleeve 60 may be stationary while the drill string or drill pipe 28 rotates. In another mode of operation, both the outer sleeve 60 and the drill pipe 28 may be rotating simultaneously with the drill pipe 28 rotating faster than the outer sleeve 60. In another mode of operation, both the outer sleeve 60 and the drill pipe 28 may be rotating simultaneously with the drill pipe 28 rotating slower than the outer sleeve 60. In another mode of operation, both the outer sleeve 60 and the drill pipe 28 may be stationary. In one or more embodiments, the outer sleeve 60 may become stuck after a stationary prolonged period in which case the drill pipe 28 may be rotatable within the outer sleeve 60. As the drill pipe 28 rotates, mud or drilling fluid may be circulated therethrough, exiting the drill string at the threaded connection 30, and circulating back toward the surface through the annulus 26. As the circulating mud and drilling fluid passes the stuck outer sleeve 60 (that is, as it flows through the annulus 26), it may dislodge the outer sleeve 60, thereby unsticking the outer sleeve 60. The drilling action of the drill pipe 28 may also cause the outer sleeve to become loosened as vibrational and gravitational effects propagate through the borehole 18 as a result of the drilling action. Thus, even in situations where the outer sleeve 60 becomes stuck, having the ability to rotate the drill pipe 28 and circulate drilling fluid may aid in quickly unsticking the outer sleeve 60.

When deployed in operation, the outer sleeve 60 of the rotary dynamic system 40 of the present disclosed embodiments may continue to rotate for a period of time after the drill pipe 28 has become stationary (for example, if a new drill pipe needs to be added or removed from the drill string). In such cases, the outer sleeve 60 may continue rotating the entire time the drill pipe 28 is stationary. In other cases, the outer sleeve 60 may stop rotating after the drill pipe 28 has become stationary, but before the drill pipe 28 begins rotating again. In these cases, even if the outer sleeve 60 stops rotating, it may allow operators to "buy time" such that the outer sleeve 60 is not stationary long enough for caking or bridging to occur, thereby preventing the drill pipe 28 from becoming stuck. Therefore, by allowing the outer sleeve 60 to continue to passively rotate after the drill pipe 28 has become stationary, the rotary dynamic system 40 of the present disclosed embodiments may enable a high percentage of stuck pipe incidents to be avoided, even in cases where the outer sleeve 60 eventually stops rotating.

In operation, the outer sleeve 60 does not need to extend through the full longitudinal length of the drill pipe 28 in order to significantly reduce the likelihood of a stuck pipe incident. In some embodiments, the diameter of the drill pipe 28 may be reduced to accommodate the outer sleeve 60 such that the outer diameter of the outer sleeve 60 is approximately (for example, within about five (5) percent) of the original drill pipe 28 outer diameter. In other embodiments, the RDS 40 may include a drill pipe 28 that includes an outer diameter that is not modified in any way, in which case the outer sleeve 60 may include an outer diameter that is about one (1) to about sixty (60) percent larger than the outer diameter of the drill pipe 28, as discussed above with respect to FIG. 2. In one or more embodiments, the outer sleeve 60 continues to rotate on its own after the drill pipe 28 becomes stationary and then subsequently becomes actively driven by one or more of the mechanisms disclosed herein. The rotary dynamic system (RDS) 40 of the present disclosed embodiments may aid in mitigating differential sticking resulting from the stationary periods, by preventing the bridging action caused by muds cakes or filter cakes around the drill string or drill pipe 28. By disposing an outer sleeve 60 around the drill pipe 28 that is free to rotate thereabout, the RDS 40 of the current embodiments shields the drill pipe 28 (or portions thereof) from being subject to the bridging action of mud cake accumulation within the borehole 18. In addition, by allowing or causing the outer sleeve 60 to continue to rotate about the drill pipe 28 (for example, while the drill pipe 28 is stationary due to the addition or removal of a drill pipe 28 to or from the drill string) bridging action may be avoided on the outer sleeve 60 as well. The rotational speeds of each of the downhole components including the outer sleeve 60, the first and second bearings 50, 62, the drill pipe 28, the top drill pipe 74, and the bottom drill pipe 76 may all be selectively varied (independently or in concert with each other) so as to avoid the various downhole components from becoming stuck.

Extended Surface System with Helical Reamer

Figure 9:
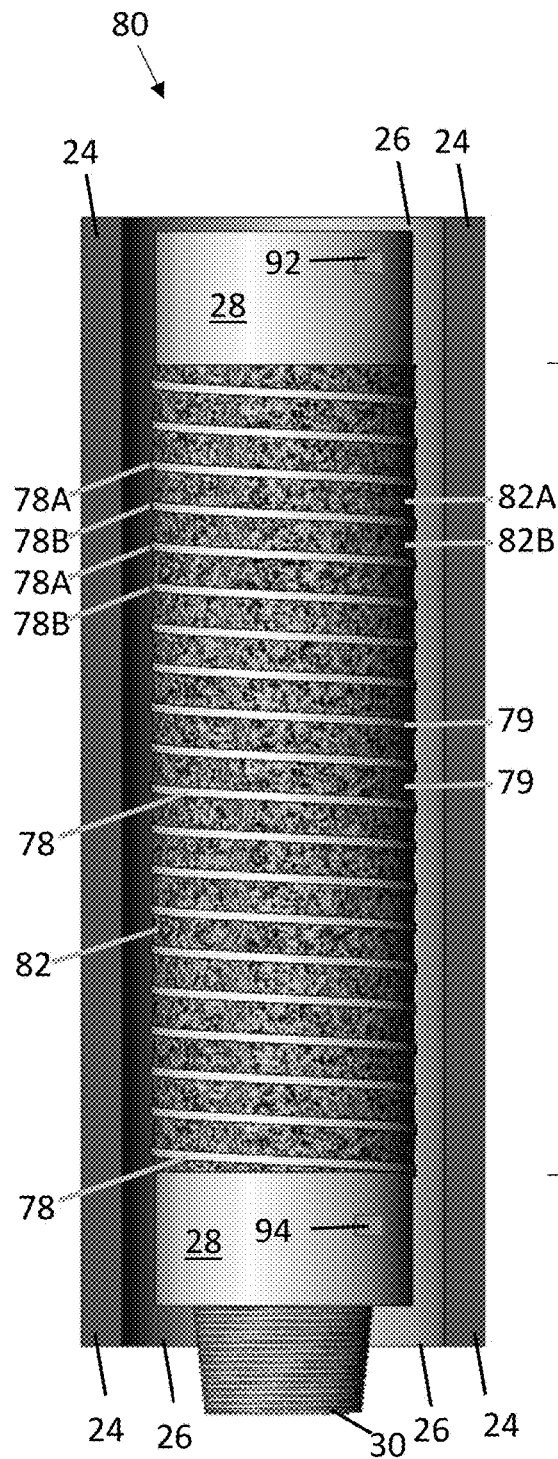
FIG. 9 illustrates a side view of a drill pipe with a helical reamer, according to aspects of the present embodiments.

FIG. 9 illustrates an extended surface system 80, according to aspects of the present disclosed embodiments. The extended surface system 80 may include a drill pipe 28 with a helical reamer (or helical reaming features) wrapping around an outer surface of the drill pipe 28 in a spiral fashion. The extended surface system 80 may be disposed within the borehole 18 (shown in FIG. 1) with an annulus 26 (for example, a radial gap) disposed between the drill pipe 28 and the borehole wall 24. A threaded connection 30 and/or bottom hole assembly (BHA) may be disposed at (or coupled to) the bottom of the drill pipe 28 for constructing the drill string. The extended surface system 80 may include one or more spiral notches 78 that wrap around the drill pipe 28 extending radially outward further than one or more spiral spacings 82, which also wrap around the drill pipe 28. The one or more spiral notches 78 alternate with the one or more spiral spacings 82 along a longitudinal (or axial) length of the drill pipe 28. Each of the spiral notches 78 and the one or more spiral spacings 82 may extend around the drill pipe 28 through the entire axial length of the drill pipe 28, or through only a center portion 84 (for example, a threaded portion 84) of the axial length of the drill pipe 28. In one or more embodiments, an outer diameter of the threaded portion 84 of the drill pipe 28 remains constant throughout the longitudinal length of the threaded portion 84.

Referring still to FIG. 9, the extended surface system 80 may include a first torque sensor 92 disposed at the top of the drill pipe 28 as well as a second torque sensor 94 disposed at the bottom end of the drill pipe 28. Each of the first and second torque sensors 92, 94 may include torque sensors that work in connection with each other to sense the respective positions of the two torque sensors 92, 94 relative to each other. As torque is applied to the drill pipe 28 (for example, via a surface rotary system or top drive system (TDS), or externally via friction from mud and debris), the drill pipe 28 may torsionally flex (that is, flex in a torsional or circumferential direction) thereby causing the position of the second torque sensor 94 to be rotated slightly from the position of the first torque sensor 92, or vice versa. As additional torque is applied to the drill pipe 28, the drill pipe 28 will torsionally flex more. Each of the first and second torque sensors 92, 94 may include proximity sensors, RFID tags, and/or magnetic teeth that may be used to sense the phase shift or angular offset between the first and second sensors torque 92, 94. A control system of the oil rig 10 communicatively coupled to the first and second sensors torque 92, 94 (which may be located, for example, at the surface) may then compute the torque that is applied to the drill pipe 28, which is directly proportional to the angular offset. In other embodiments, the first and second torque sensors 92, 94 may include strain gauges and/or Hall sensors (in addition to, or in place of, the torque sensors) in order to sense the resistive torque acting on the drill pipe 28 either or directly, or indirectly (for example, as a function of the rotational speed and the applied torque from a rotary table and/or top drive system (TDS)).

During drilling operations, as debris, rock fragments, cuttings, drilling fluid (such as drilling mud) and/or other substances and objects accumulate in the annulus 26 at the bottom of the borehole 18, the friction acting on the drill pipe 28 may increase to the point where the drill pipe 28 would ordinarily become stuck. The extended surface system 80 of the present disclosed embodiments may be used to un-stick the drill pipe 28 and/or prevent the incidence of stuck drill pipes 28. As the drill pipe 28 rotates during drilling operations, drill or rock fragments may be trapped between the drill pipe 28 and the borehole wall 24. The one or more spiral notches 78 may help to axially raise and/or lower the fragments (as the extended surface system 80 acts like a screw), thereby freeing the drill pipe 28 from being stuck by the accumulated debris. As such, the extended surface system 80 (including helical reaming features) may act as a spiral elevator or lifter to remove accumulated debris from the bottom of the borehole 18. In other embodiments, the helical reaming features (that is, the one or more spiral notches 78) may act as grinders or reamers and may grind the debris such that it becomes pulverized, fragmented further, and/or fractured into smaller pieces, again resulting in the drill pipe becoming unstuck.

Still referring to FIG. 9, the one or more spiral notches 78 (as well as the one or more spiral spacings 82) may include a wear-resistant coating 79 disposed thereon, the wear-resistant coating 79 being composed of materials and/or alloys such as TiN, ZrN, TiC, Ti—Al, CrN, Ni—Cr—B—Si—C alloys, tungsten carbide, ceramic coatings, metallic coatings, composite coatings (for example, coatings that include multiple layers made up of different materials such as binders, environmental barrier coatings (EBC), thermal barrier coatings (TBC), et cetera), and other suitable materials and combinations thereof. The wear-resistance coating(s) 79 may be applied to the surface as thin films and/or sprays via cold-spray, plasma spray, arc vapor deposition, atomic layer deposition (ALD), high-powered pulsed magnetron sputtering (HPPMS), mid-frequency/dual magnetron sputtering (MF/DMS), glancing angle of incidence deposition (GLAD), sintering, and/or other suitable methods. The wear-resistant coating(s) 79 may include a thickness from about 1 micron to about 800 microns, or from about 2 microns to about 500 microns, or from about 3 microns to about 300 microns, or from about 4 microns to about 200 microns, or from about 5 microns to about 130 microns, or from about 10 microns to about 90 microns, or from about 15 microns to about 70 microns, or from about 25 microns to about 60 microns, or from about 30 microns to about 55 microns, and/or other subranges therebetween. The wear-resistant coating(s) 79 may include a hardness (using the Vickers Pyramid Number (Hv)) from about 40 Hv to about 2500 Hv, or from about 100 Hv to about 2000 Hv, or from about 200 Hv to about 1600 Hv, or from about 300 Hv to about 12000 Hv, or from about 500 Hv to about 800 Hv, and/or other subranges therebetween.

Referring still to FIG. 9, in one embodiment, the one or more spiral notches 78 may be disposed around the drill pipe 28 such that a single spiral notch 78 wraps continuously around drill pipe 28. In another embodiment, multiple spiral notches 78 (for example two (2), three (3), four (4), five (5), six (6), or more than six (6)) may wrap around the drill pipe 28 such that they alternate. For example a first spiral notch 78A may wrap around the drill pipe 28 such that it alternates with a second spiral notch 78B along an axial length of the drill pipe 28, in embodiments that include two (2) spiral notches 78A, 78B. In such embodiments, the one or more spiral spacings 82 would correspondingly include a first spiral spacing 82A that alternates with a second spiral spacing 82B along the axial length of the drill pipe 28, in the spaces between the first and second spiral notches 78A, 78B. In one or more embodiments, one or more of the spiral notches 78, 78A, 78B may include at least one gap (thereby causing the spiral notches 78, 78A, 78B to be non-continuous or segmented), allowing debris to become dislodged via (or through) the at least one gap (not shown). The one or more gaps may be preferentially spaced both circumferentially and axially throughout the threaded portion 84 of the drill pipe 28. The edge or edges of the spiral notches 78 adjacent to the one or more gaps may also be used as grinding features for grinding up debris and/or rock fragments. In one embodiment, as the torque on the drill pipe 28 increases (for example due to the accumulation of debris in the borehole 18), the first and second sensors 92, 94 may send a signal to the control system that the drill pipe 28 is beginning to get stuck or has already become stuck (as increased torque may be predictive or indicative of a stuck drill pipe 28). The control system may then cause the drill pipe 28 to rotate in an opposite direction, thereby lowering or raising the debris in the annulus 26 jammed between the drill pipe 28 and the borehole wall 24, and serving to loosen up the drill pipe 28, and/or unjam the debris. Drilling operations may then be reinitiated in the original direction of rotation once the drill pipe 28 has become unstuck. Because, the rotational action of the drill string in the opposite direction of the normal drilling operation may disconnect the drill pipes 28 from each other because the threaded connection 30 may be unscrewed, it is important to monitor the torque on drill string during reverse-direction drilling operations to ensure an unscrewing torque is not exceeded.

Figure 10:
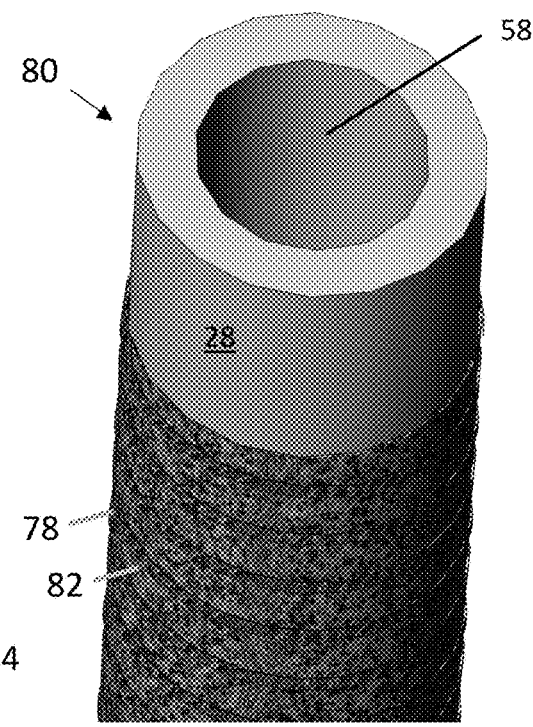
FIG. 10 illustrates a perspective view of a drill pipe with a helical reamer, according to aspects of the present embodiments.

FIG. 10 illustrates a perspective view of the extended surface system 80, according to aspects of the present embodiments. The extended surface system 80 includes the drill pipe 28 including a hollow interior or through-bore 58 as well as the one or more spiral notches 78, and the one or more spiral spacing 82 wrapped there-around.

Figure 11:
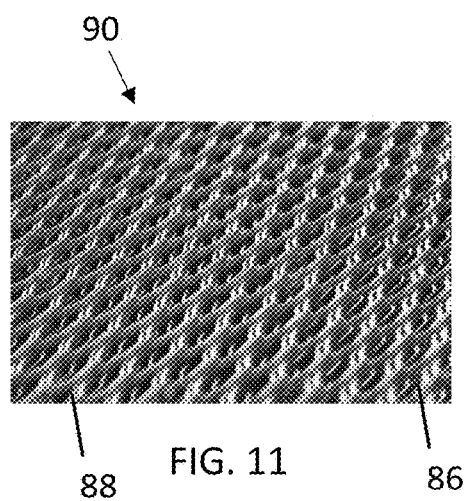
FIG. 11 illustrates a side view of a surface features of a drill pipe with a helical reamer, according to aspects of the present embodiments.

FIG. 11 illustrates an enlarged perspective view of a gripping surface 90 that may be used instead of, or in addition to, the one or more spiral notches 78 and the one or more spiral spacings 82, to help grip and remove debris that becomes stuck between the drill pipe 28 and the borehole wall 18. The gripping surface 90 may be disposed around the drill pipe 28 (for example, via epoxy, glue, fusion, sintering, adhesion, compression fit, welding, brazing, latches, and/or other suitable mechanisms), and in one embodiment, may grip the exterior surface of the drill pipe 28 with a predetermined or selected amount of torque or friction. In such embodiments (which may use a loose compression fit), the gripping surface 90 will generally rotate with the drill pipe 28 due to the predetermined friction or compression of the gripping surface 90 around the drill pipe 28. As the external torque or friction acting on the drill pipe 28 (for example, due to mud caking or bridging) increases, the gripping surface 90 may become temporarily stuck to the mud cake 42 (shown in FIGS. 3 and 4). In such cases, the drill pipe 28 may still be rotatable within the gripping surface 90 if a torque exceeding the predetermined torque (or friction amount) is applied to the drill pipe 28. The rotation of the drill pipe 28 within the gripping surface 90 may help to loosen up the gripping surface 90, especially if pressurized drilling fluids are present as a result of the rotation of the drill pipe 28. The gripping surface 90 may include a plurality of crisscrossing, intersecting, and/or interlocking elements including a first plurality of wires 86 (for example, metallic wires) disposed radially outward of (and crisscrossing with)

a second plurality of wires 88, where the first plurality of wires 86 is oriented at a different angle than the second plurality of wires 88. The first and second pluralities of wires 86, 88 may intersect at an angle from about 45 degrees to about 90 degrees, or from about 50 degrees to about 80 degrees, or from about 55 degrees to about 75 degrees, or from about 60 degrees to about 70 degrees, and/or other subranges therebetween.

FIG. 12 illustrates a schematic side view of the extended surface system 80, according to aspects of the present disclosed embodiments. Each of the one or more spiral notches 78 may be oriented at a first angle 96 from a radial direction 104. The first angle may be from about one (1) degree to about forty-five (45) degrees, or from about two (2) degrees to about thirty-five (35) degrees, or from about three (3) degrees to about thirty (30) degrees, or from about four (4) degrees to about twenty-five (25) degrees, or from about five (5) degrees to about twenty (20) degrees, or from about six (6) degrees to about fifteen (15) degrees, or from about seven (7) degrees to about ten (10) degrees, or from about three (3) degrees to about seven (7) degrees, or from about four (4) degrees to about six (6) degrees, and/or other subranges therebetween. A notch spacing 98 defined between each of the spiral notches 78 (for example, the axial height of the spiral spacings 82) may be from about one (1) to about ten (10) times a thickness of each spiral notch 78, or from about one-and-a-half 1.5 to about eight (8) times the thickness of each spiral notch 78, or from about two (2) to about six (6) times the thickness of each spiral notch 78, or from about two-and-a-half (2.5) to about five (5) times the thickness of each spiral notch 78, or from about three (3) to about four (4) times the thickness of each spiral notch 78, and/or other subranges therebetween. A protrusion height 102 may be defined as the difference between the radius of each spiral notch 78 and the outer radius of the drill pipe 28. The protrusion height 102 may be dimensioned such that the notch spacing 98 is from about one (1) to about twenty (20) times the protrusion height 102, or from about two (2) to about fifteen (15) times the protrusion height 102, or from about three (3) to about ten (10) times the protrusion height 102, or from about four (4) to about nine (9) times the protrusion height 102.

FIG. 13 illustrates a side view of a hybrid system 100 combining features of the helical reamer (or extended surface system 80) of FIG. 9 with the rotary dynamic system 40 of FIG. 5, according to aspects of the present disclosed embodiments. The hybrid system 100 may include the first and second bearings 50, 62 of the rotary dynamic system 40 as well as the one or more spiral notches 78 and the one or more spiral spacings 82 of the extended surface system 80. The hybrid system may also include the first, second, third, and fourth sensors 66, 68, 70, 72, as well as the first and second torque sensors 92, 94. The one or more spiral notches 78 may extend around each of the first and second bearings 50, 62. In other embodiments, the one or more spiral notches 78 may extend around the center portion 84 (or threaded portion 84) of the drill pipe 28, but not around the one or more spiral notches 78. In operation, the hybrid system 100 functions such that both the helical reaming features (that is, the spiral notches 78) and the first and second bearings 50, 62 act to prevent the incidence of stuck pipes. In particular, the spiral notches 78 help to grind up and unjam debris stuck in the annulus 26 between the drill pipe 28 and the borehole wall 24, while the first and second bearings 50, 62 allow the drill pipe 20 to rotate within the outer sleeve 60, thereby allowing for the continuous circulation of fluids (for example, water, mud and/or other drilling fluids), and thereby reducing the likelihood of the drill pipe 28 becoming permanently stuck.

Figures 14, 15:
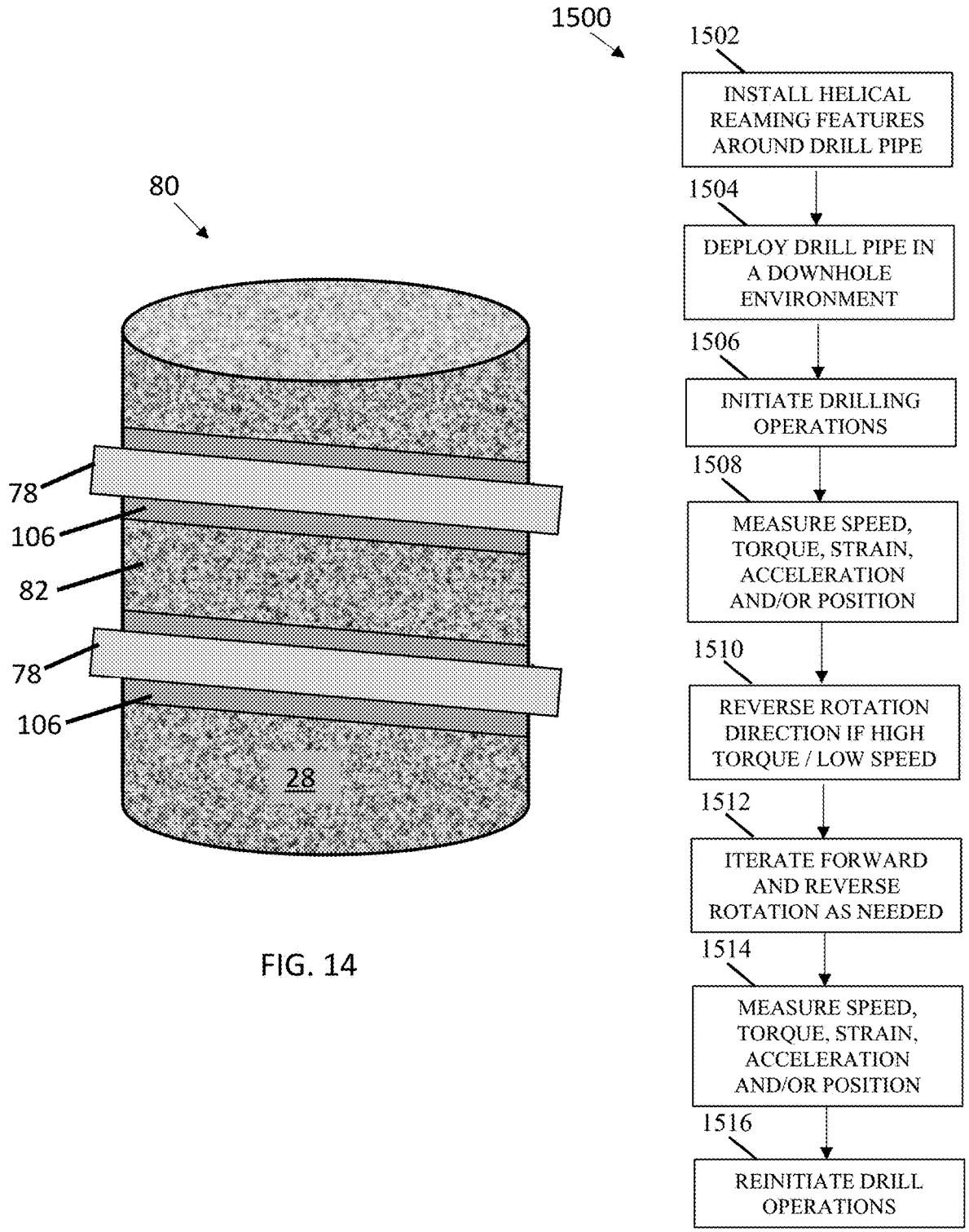
FIG. 14 illustrates a perspective side view of a helical reamer, according to aspects of the present embodiments.
FIG. 15 illustrates a schematic of a method of preventing the incidence of stuck pipes, according to aspects of the present disclosed embodiments.

FIG. 14 illustrates an enlarged, perspective side view of the extended surface system 80, according to aspects of the present disclosed embodiments. In the embodiment of FIG. 14, a helical transition plate 106 is disposed around the outer circumference of the drill pipe 28, radially inward of the one or more spiral notches 78. The helical transition plate 106 may be joined to each of the one or more spiral notches 78 and the drill pipe 28 via any suitable mechanism including compression fit, epoxy, welding, brazing, glue, fusion, sintering, adhesion, and/or latches. In one or more embodiments, the helical transition plate 106 may be monolithic, solitary, and/or integral with the one or more spiral notches 78 (that is, they may be formed as a single piece or component). Because the one or more spiral notches 78 may undergo high stresses due to contact with debris that gets jammed between the drill pipe 28 and the borehole wall 24, the helical transition plate 106 aids in distributing the stresses and transferring of forces between the one or more spiral notches 78 and the drill pipe 28 over a wider area, thereby reducing the likelihood that the spiral notches 78 will break off of (or become detached from) the drill pipe 28. The helical transition plate 106 may be composed of aluminum, galvanized steel, stainless steel, brass, bronze, copper, carbon steel, austenitic steel, other metallic materials and alloys thereof, composite materials such as metal matrix composites and polymer matrix composites, thermoplastics, polymer materials such as polyether ether ketone (PEEK), other suitable materials, and combinations thereof. A width of the helical transition plate 106 may be approximately equal to the width of the spiral spacing 82 (for example, within about ten (10) percent or within about twenty (20) percent of the width of the spiral spacings 82). The width of the helical transition plate 106 may also be between about twice the width of the spiral notches 78, or about three (3) times the width of the spiral notches 78, or from about one-and-a-half (1.5) to about five (5) times the width of the spiral notches 78.

FIG. 15 illustrates a method 1500 of operating the extended surface system 80 with helical reaming features, according to aspects of the present disclosed embodiments. At step 1502, the method 1500 may include installing helical reaming features (for example, the one or more spiral notches 78 and the wear resistant coating 79) on or around the drill pipe 28. At step 1504, the method 1500 may include deploying the drill pipe 28 in a downhole environment (for example, in the borehole 18). At step 1506, the method 1500 may include initiating drilling operations which may include rotating the drill pipe 28 and circulating drilling fluid (and/or other fluids) therethrough. At step 1508, the method 1500 may include measuring at least one of: the rotational speed of the drill pipe 28, the torque or friction acting on the drill pipe 28, the rotational acceleration of the drill pipe 28, and/or the angular position of the drill pipe 28, via at least one of the first, second, third, and fourth sensors 66, 68, 70, 72, and/or via the first and/or second torque sensors 92, 94.

Referring still to FIG. 15, at step 1510, the method 1500 may include reversing the direction of rotation of the drill pipe 28 if the control system determines that the drill pipe 28 is stuck or beginning to become stuck (for example, due to the accumulation of debris in the borehole 18 and/or annulus 26). The rotational action of the drill string in the opposite direction of the normal drilling operation may disconnect the drill pipes 28 from each other because the threaded connection 30 may be unscrewed. Reversing the direction of rotation of the drill pipe 28 may be monitored closely to ensure the threaded connections 30 do not become unscrewed. The control system may determine that the drill pipe 28 is stuck or beginning to become stuck by sensing a high torque acting on the drill pipe 28 (that is, torque above a first predetermined threshold), or by sensing a low rotational speed (or acceleration) of the drill pipe 28 (that is, a rotational speed below a second predetermined threshold). At step 1512, the method 1500 may include iterating operations of the drill pipe 28 from a forward direction to a reverse direction, and vice versa, as needed to unstick the drill pipe 28 and/or to unjam any debris jammed between the drill pipe 28 and the borehole wall 24 (thereby causing the torque acting on the drill pipe 28 to fall below the first predetermined threshold and/or causing the rotational speed of the drill pipe 28 to increase above the second predetermined threshold). At step 1514, the method 1500 may include measuring the speed of acceleration of the drill pipe 28, and/or the torque or strain acting on the drill pipe 28 via the first, second, third, and/or fourth sensors 66, 68, 70, 72, and/or via the first and/or second torque sensors 92, 94. At step 1516, the method 1500 may include reinitiating drilling operations once the high torque or friction acting on the drill pipe 28 has been reduced or eliminated thereby indicating that the drill pipe 28 has become unstuck or loosened. Steps 1502-1516 of method 1500 may be performed in different orders or sequences than what is shown in FIG. 15. In addition, one or more steps may be repeated or omitted. In other embodiments, one or more of steps 1502-1516 may be performed concurrently with at least one other step of method 1500.

The extended surface system 80 of the present disclosed embodiments may be utilized statically such that the helical reaming features (that is, the spiral notches 78, the spiral spacings 82, and the wear resistant coatings 79) are disposed directly onto the drill pipe 28 (thereby causing the extended surface system 80 with helical reaming features to rotate, move and/or become stationary in unison with the drill pipe 28). In such embodiments, the control system may rotate or drive the drill pipe 28 when necessary. In other embodiments, the extended surface system 80 may be used dynamically in connection with the rotary dynamic system 40 disclosed herein. In other embodiments, the extended surface system 80 may include one or more gripping surfaces 90 disposed around the drill pipe 28, and allowing the drill pipe 28 to rotate therewithin when a predetermined external torque (for example, from the accumulation of mud or debris around the drill pipe 28) acts on the gripping surface 90. The helical reaming features and grinding surfaces of the drill pipe 28 (including the spiral notches 78 and other surfaces covered with wear-resistant coatings or materials 79) may be used to grind the drill cuttings and/or debris as much as possible to completely eliminate them, or to make them smaller and therefore easier to extract out of the borehole via the drilling fluid. In some embodiments, the extended surface system 80 may include small rollers (not shown) in the helical reaming features and/or the grinding surfaces. The small rollers may store chemicals that help reduce or eliminate the cuttings and/or debris. The small rollers may release the chemicals when the cuttings press hard on the outer surface of the rollers. For example, the rollers may be squeezed by the cuttings, and then supply the stored chemicals.

The helical reaming features of the extended surface system 80 of the present disclosed embodiments may be used, simultaneously, as grinders to break down large rock fragments, as well as debris extraction tools to lift pieces out of the borehole via the spiral elevator functionality. Therefore, the extended surface system 80 and features thereof have the ability to act as a spiral elevator or lifter for the purpose of eliminating or extracting cuttings from the borehole 18 up to the surface. By deploying the extended surface system 80 with helical reaming features of the present disclosed embodiments into downhole environments such as boreholes 18, the incidence of stuck drill pipes 28 resulting from accumulated debris at the bottom of the borehole 18 may be reduced or eliminated, thereby resulting in minimization of oil rig downtime and substantial cost savings.

Drill Pipe with Dissolvable Layer

The present disclosed embodiments include apparatuses, methods, compositions, and systems for alleviating stuck pipe and stuck drill string incidents during drilling operations. The apparatuses, methods, compositions, and systems may use a drill pipe with a dissolvable layer. The dissolvable layer may be placed on an outer surface of the drill pipe. When the drill pipe is stuck in a borehole, a dissolving solution may be delivered to the dissolvable layer of the drill pipe, thereby dissolving the dissolvable layer. The removal of a portion of the dissolvable layer may assist movement of the drill pipe. For example, the dissolution may reduce the outer diameter of the dissolvable layer, creating space between the drill pipe and the borehole. Additionally or alternatively, the dissolution may eliminate the surface where mud cake has accumulated.

Figures 16, 17:
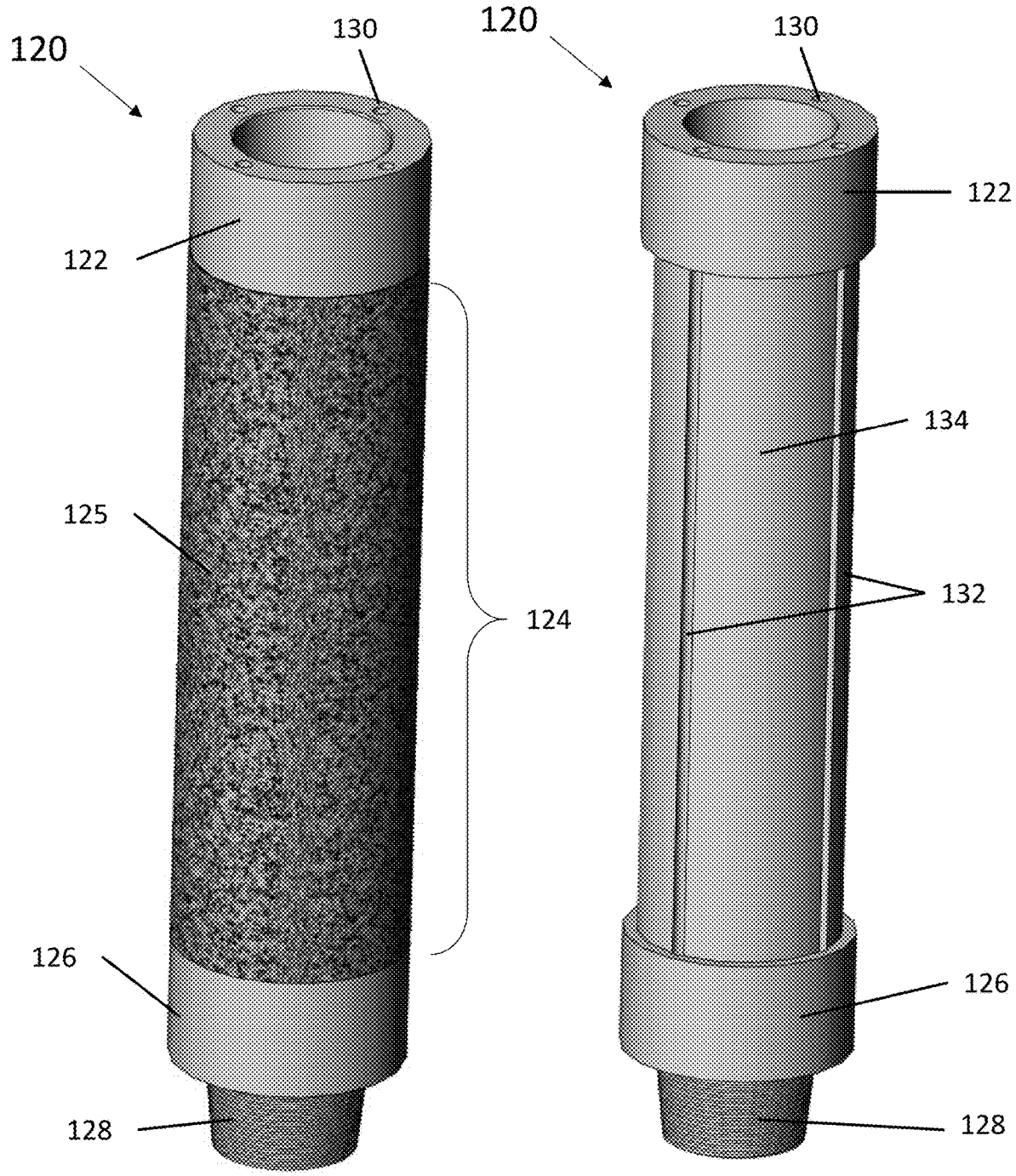
FIG. 16 illustrates a side view of a drill pipe with a dissolvable layer, according to aspects of the present disclosed embodiments.
FIG. 17 depicts a side view of a drill pipe without a dissolvable layer, according to aspects of the present disclosed embodiments.

FIG. 16 illustrates a schematic side view of a drill pipe 120 with a dissolvable layer 125, according to aspects of the present embodiments. In some embodiments, the dissolvable layer 125 is deposited on the outer surface 134 (shown in FIG. 17) of the drill pipe 120. The outer diameter of the top portion 122 of the drill pipe 120 may be greater than the outer diameter of the center portion 124 of the drill pipe 120. The outer diameter of the bottom portion 126 of the drill pipe 120 may also be greater than the outer diameter of the center portion 124 of the drill pipe 120. The outer diameter of the dissolvable layer 125 may be substantially similar (for example, within 1%, 5%, or 10% of) to the outer diameter of the top portion 122 before the dissolution process. The outer diameter of the dissolvable layer 125 may be substantially similar (for example, within 1%, 5%, or 10% of) to the outer diameter of the bottom portion 126 before the dissolution process. The drill pipe 120 may further include a threaded connection 128.

FIG. 17 illustrates a schematic side view of a drill pipe 120 without a dissolvable layer 125 exposing tunnels 132, according to aspects of the present embodiments. The tunnels 132 are accessible from the top 130 of the drill pipe 120. The tunnels 132 may extend longitudinally along the length of the center portion 124. Through the tunnels 132, a dissolving solution may be delivered to the dissolvable layer 124. As the tunnels 132 are connected to the top 130 of the drill pipe 120, the dissolving solution may be introduced from the top 130 of the drill pipe to the dissolvable layer 125. The drill pipe 120 may include a plurality of tunnels 132, so that the dissolving solution can be distributed to the dissolvable layer 125 rapidly. The tunnels 132 may be parallel to each other. The tunnels 132 may extend axially toward the bottom portion 126 of the drill pipe 120. In some embodiments, the tunnels 132 are in contact with the dissolvable layer 125. In some embodiments, each of the tunnels 132 is designed to deliver the dissolving solution to only a specific portion of the dissolvable layer 125. In some embodiments, the tunnels 132 may fluidly connect more than one drill pipes 120. For example, when the drill string includes at least two drill pipes 120, the tunnels 132 in each drill pipe 120 are aligned so that the dissolving solution may be delivered from the top of the first drill pipe 120 to the bottom of the second drill pipe 120.

Figure 18:
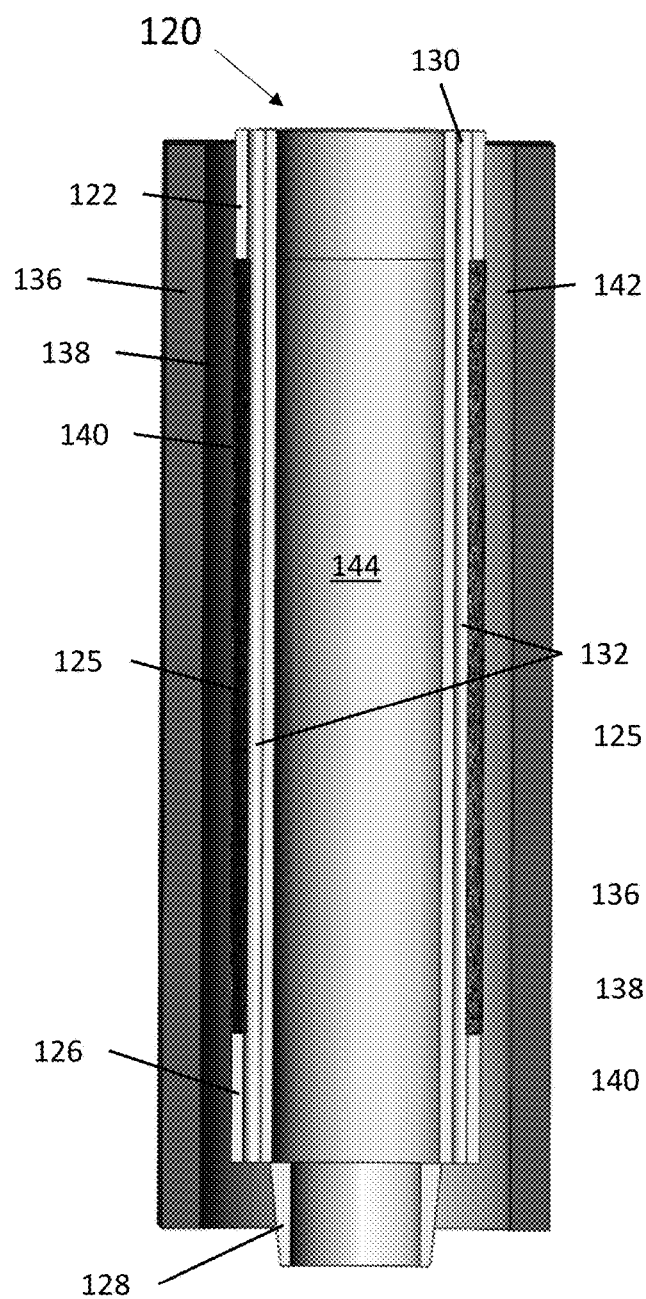
FIG. 18 displays a crosssectional view of a drill pipe with a dissolvable layer within a borehole, according to aspects of the present disclosed embodiments.
Figure 19:
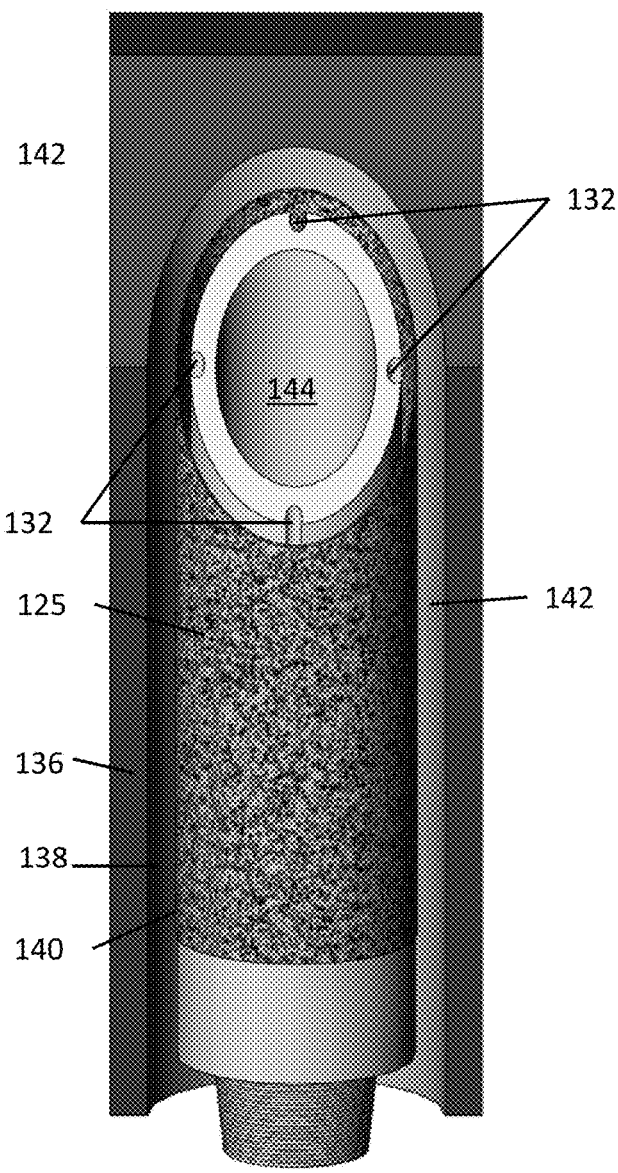
FIG. 19 illustrates a side and crosssectional view of a drill pipe with a dissolvable layer within a borehole, according to aspects of the present disclosed embodiments.

FIGS. 18 and 19 show schematic views of a drill pipe 120 with a dissolvable layer 125 within a borehole, according to aspects of the present embodiments. The drill pipe 120 may be caked with mud 138. The mud cake may bridge from the wall 136 of the borehole to the outer surface 140 of the dissolvable layer 125. When the drill pipe 120 is not concentric within the borehole due to the differential pressure between the wellbore and the reservoir, bridging may occur where the gap 142 between the drill pipe 120 and the wall of the borehole is small. For example, when there is a high differential pressure between the drilling fluid hydrostatic circulated in the borehole via the drill string and the existing rock formation pressure, the drill string may be forced to rest against the borehole wall 24, sinking into the mud cake (filter cake) and causing the drill string to stick to it. Since the dissolvable layer 125 is the outermost layer 140, the dissolution of the dissolvable layer 125 may remove mud bridges 138 thereon. Additionally and/or alternatively, the removal of the dissolvable layer 125 provides space between the drill pipe 120 and the borehole 136, so that the drill pipe 120 may be moved radially within the borehole. In some embodiments, only a portion of the dissolvable layer is removed. In some embodiments, the dissolution process releases gas, thereby increasing the pressure in the borehole. In some embodiments, the dissolution of the dissolvable layer 125 provides a slippery medium, assisting rotational movements of the drill pipe 120.

Figure 20:
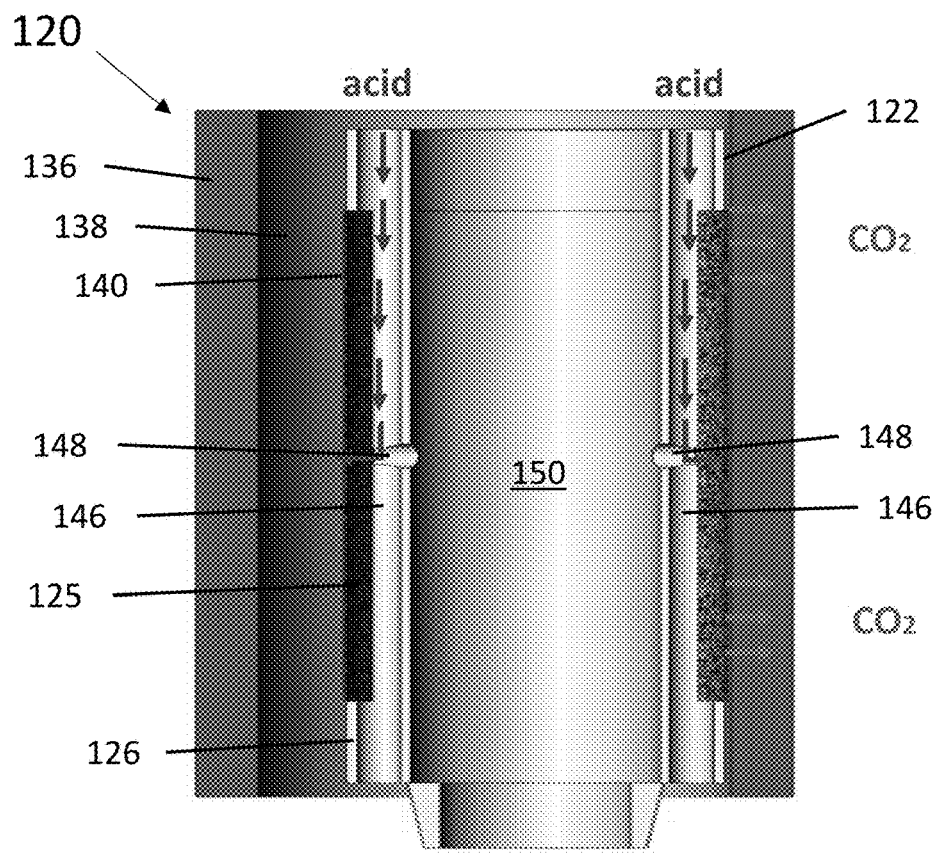
FIG. 20 shows a crosssectional view of a drill pipe with a dissolvable layer within a borehole, according to aspects of the present disclosed embodiments.
Figure 21:
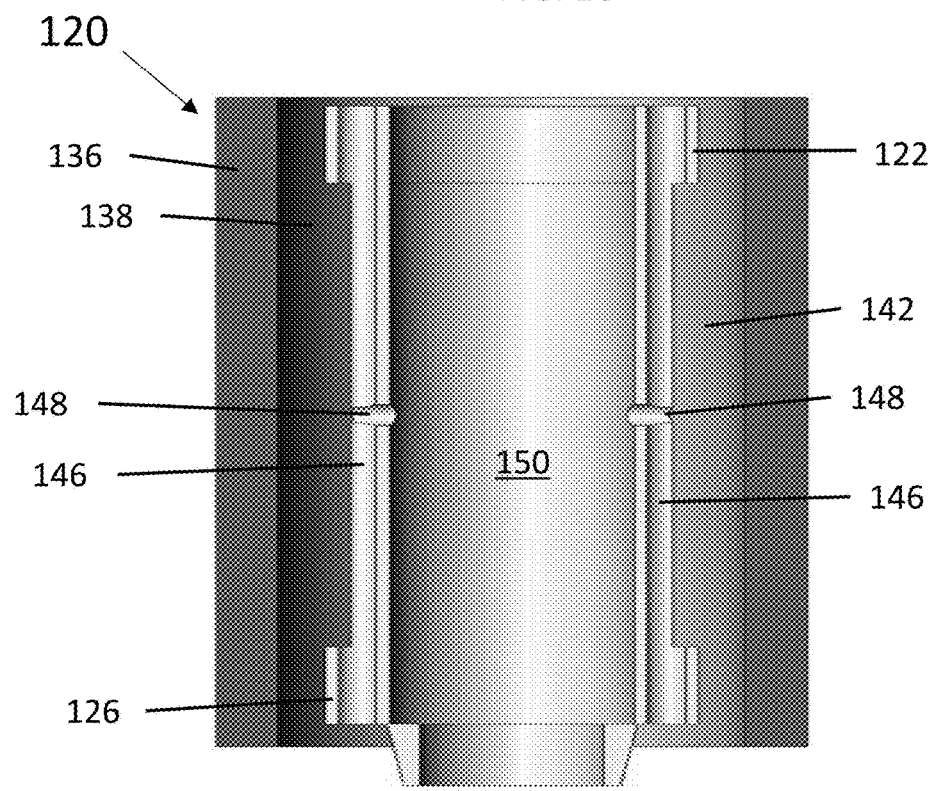
FIG. 21 depicts a crosssectional view of a drill pipe without a dissolvable layer within a borehole, according to aspects of the present disclosed embodiments.

FIG. 20 depicts an alternative embodiments of a drill pipe 120 with a dissolvable layer 125 within a borehole, according to aspects of the present embodiments. In some embodiments, the tunnels 146 may not directly be in contact with the dissolvable layers 125. The tunnels 146 may be connected to the dissolvable layer 125 via one or more channels 148. In some embodiments, the channels 148 extend radially from the tunnels 146 to the dissolvable layer 125, which is radially inward of the dissolvable layer 125 and radially outward of the tunnels 146. In some embodiments, the drill pipe 125 includes a plurality of the channels 148. FIG. 21 shows the drill pipe without the dissolvable layer 125. In FIG. 21, the drill pipe 120 is not concentric within the borehole. For example, a portion of the drill pipe 120 (for example, the right side in FIG. 21) is in contact with the borehole. The contacting portion may be bridged with mud. In contrast, the drill pipe 120 may be positioned concentrically in the borehole after removing the dissolvable layer 125 and the mud bridge in FIG. 21.

In some embodiments, the dissolvable layer 125 may include a material dissolvable by a dissolving solution. In some embodiments, the dissolvable layer 125 includes $CaCO_3$. In some embodiments, the dissolvable layer 125 includes plastics, such as phenolic resins, glass fibres or a metal mesh, such as or aluminium.

In some embodiments, the dissolving solution may include an acid. In some embodiments, the dissolving solution may include an acid selected from the group consisting of hydrofluoric acid (HF), hydrochloric acid (HCl), hydrobromic acid (HBr), hydroiodic acid (HI), hypochlorous acid (HClO), chlorous acid ($HClO_2$), chloric acid ($HClO_3$), perchloric acid ($HClO_4$), hypobromic acid (HBrO), bromous acid ($HBrO_2$), chloric acid ($HBrO_3$), perbromic acid ($HBrO_4$), hypoiodous acid (HIO), iodous acid ($HIO_2$), iodic acid ($HIO_3$), periodic acid ($HIO_4$), hypofluorous acid (HFO), sulfuric acid ($H_2SO_4$), fluorosulfuric acid ($HSO_3F$), nitric acid ($HNO_3$), phosphoric acid ($H_3PO_4$), fluoroantimonic acid ($HSbF_6$), fluoroboric acid ($HBF_4$), hexafluorophosphoric acid ($HPF_6$), chromic acid ($H_2CrO_4$), boric acid ($H_3BO_3$), and combinations thereof.

In some embodiments, the dissolvable layer 125 may include $CaCO_3$, and the dissolving solution may include hydrochloric acid (HCl). When the dissolvable layer 125 including $CaCO_3$ reacts with the dissolving solution including HCl, $CO_2$ will be released as shown in the below chemical reaction Formula 1.

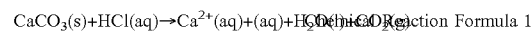

$$CaCO_3(s) + HCl(aq) \rightarrow Ca^{2+}(aq) + (aq) + H_2O(l) + CO_2(g) \quad \text{Chemical Reaction Formula 1}$$

In some embodiments, a porosity of the dissolvable layer 125 is within a range from about 10% to about 40%. In some embodiments, a porosity of the dissolvable layer 125 is within a range from about 10% to about 30%. In some embodiments, a porosity of the dissolvable layer 125 is within a range from about 10% to about 20%. In some embodiments, a porosity of the dissolvable layer 125 is within a range from about 20% to about 40%. In some embodiments, a porosity of the dissolvable layer 125 is within a range from about 30% to about 40%.

In some embodiments, a molarity of the dissolving solution is within a range from about 1 M to about 30 M. In some embodiments, a molarity of the dissolving solution is within a range from about 1 M to about 20 M. In some embodiments, a molarity of the dissolving solution is within a range from about 1 M to about 10 M. In some embodiments, a morality of a dissolving solution is within a range of about 1 M to about 5 M. In some embodiments, a molarity of the dissolving solution is within a range from about 5 M to about 30 M. In some embodiments, a molarity of the dissolving solution is within a range from about 10 M to about 30 M. In some embodiments, a molarity of the dissolving solution is within a range from about 20 M to about 30 M.

In some embodiments, a thickness of the dissolvable layer 125 is within a range from about 1 mil to about 500 mils, where a mil is a thousandth of an inch. In some embodiments, a thickness of the dissolvable layer 125 is within a range from about 2 mils to about 300 mils. In some embodiments, a thickness of the dissolvable layer 125 is within a range from about 5 mils to about 150 mils. In some embodiments, a thickness of the dissolvable layer 125 is within a range from about 10 mils to about 100 mils. In some embodiments, a thickness of the dissolvable layer 125 is within a range from about 15 mils to about 80 mils. In some embodiments, a thickness of the dissolvable layer 125 is within a range from about 20 mils to about 60 mils. In some embodiments, a thickness of the dissolvable layer 125 is within a range from about 30 mils to about 40 mils. In some embodiments, a thickness of the dissolvable layer 125 may be less than a thickness of the tool joint of the drill pipe 120. In some embodiments, an outer diameter of the dissolvable layer 125 may be less than an outer diameter of the tool joint of the drill pipe 120.

In some embodiments, the drill pipe 120 may include one tunnel. In some embodiments, the drill pipe 120 may include two tunnels 146 spaced 180° apart. In some embodiments, the drill pipe 120 may include three tunnels 146 spaced 120° apart. In some embodiments, the drill pipe 120 may include four tunnels 146 spaced 90° apart. In some embodiments, the drill pipe 120 may include five tunnels 146 spaced 72° apart. In some embodiments, the drill pipe 120 may include six tunnels 146 spaced 60° apart. In some embodiments, the tunnel(s) 146 may be positioned on an outer surface of the drill pipe 120. In some embodiments, the tunnel(s) 146 extend axially from a top portion 122 to a bottom portion 126 of the drill pipe 120. In some embodiments, the tunnel(s) 146 may be helix shaped. In some embodiments, the tunnel(s) 146 may be zigzag shaped. In some embodiments, the tunnel(s) 146 may be sinusoidal shaped. In some embodiments, the tunnel(s) 146 may be vertical sine wave shaped.

In some embodiments, the tunnel(s) 146 may be located within a wall of the drill pipe 120. In other words, the tunnel(s) 146 may not be exposed to or in contact with the dissolvable layer 125. In some embodiments, the tunnel(s) may be annulus shaped, and may be disposed between inner and outer walls of the drill pipe 125. In some embodiments, the tunnel(s) 146 extend axially within the wall of the drill pipe 125. In some embodiments, the tunnel(s) may be helix shaped within the wall of the drill pipe 125. Such a drill pipe 125 may include channel(s) 148 connecting the tunnel(s) 146 and the dissolvable layer 125. In some embodiments, the channel(s) 148 connect the tunnel(s) 146 and dissolvable layer 125 radially. In some embodiments, the drill pipe 120 may include at least one channel 148 for each tunnel 146. In some embodiments, the drill pipe 120 may include one, two, three, four, five, six, seven, eight, nine, and/or more than nine channel(s) 148 for each tunnel 146. Each channel 148 may include a larger diameter at a radially inner end and a smaller diameter at a radially outer end. In some embodiments, the larger diameter of the channel(s) 148 may be within a range from about 1 mil to about 500 mils. In some embodiments, the channels 148 may be equally positioned and spaced along the entire length of the drill pipes 120.

Figure 22:
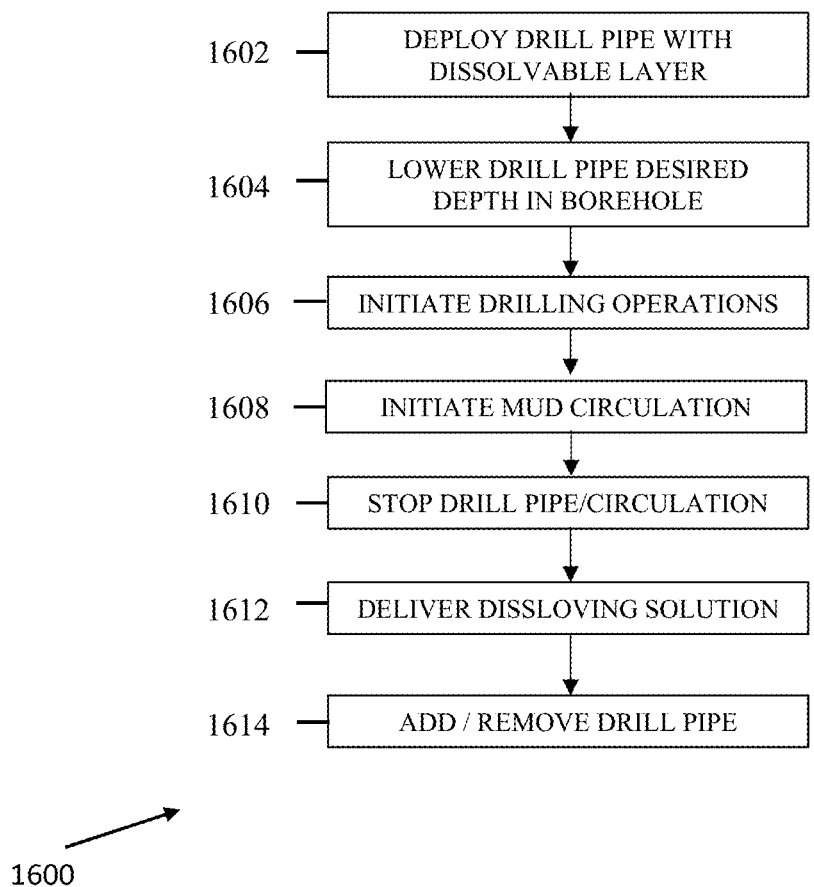
FIG. 22 illustrates a schematic of a method, according to aspects of the present disclosed embodiments.

FIG. 22 illustrates a method 1600 of preventing or reducing the incident of stuck pipes using a drill pipe 120 with a dissolvable layer 125. At step 1602, the method 1600 may include deploying the drill pipe including the dissolvable layer 125 and the tunnel 146 for accessing the dissolvable layer 125 at or near surface of the borehole. At step 1604, the method 1600 may include lowering the drill pipe 120 to a desired depth (for example, for drilling purposes) within the borehole 18. At step 1606, the method 1600 may include initiating drilling operations, as well as initiating the circulation of mud (at step 1608) through the center bore or through-bore 58 of the drill pipe 120. At step 1610, the method 1600 may include stopping the drill pipe 120 and stopping the circulation of mud and/or drilling fluid (for example, if a new drill pipe needs to be added or removed from the drill string). At step 1610, the method 1600 may include delivering a dissolving solution to remove the dissolvable layer 125 as well as the mud cake created on the dissolvable layer 125. In some embodiments, the dissolving solution may be supplied by a circulating system of the drilling rig system. The dissolving solution may be pumped to the tunnels 132 from the top 130 of the drill pipe 120. The method 1600 may include allowing the dissolvable layer to dissolve for a predetermined length of time.

In some embodiments, the predetermined length of time may be from about 1 minute to about 60 minutes. In some embodiments, the predetermined length of time may be from about 1 minute to about 30 minutes. In some embodiments, the predetermined length of time may be from about 1 minute to about 15 minutes. In some embodiments, the predetermined length of time may be from about 1 minute to about 10 minutes. In some embodiments, the predetermined length of time may be from about 1 minute to about 5 minutes. In some embodiments, the predetermined length of time may be from about 2 minutes to about 4 minutes.

In some embodiments, a flow rate of a dissolving solution to a dissolvable layer may be substantially similar to (for example, within about 1% of, within about 5% of, and/or within about 10% of) the flow rate of the circulation fluid.

The drill pipe 120 and dissolvable layer 125 of the present disclosed embodiments may remain fluidly connected to a source of dissolving solution, even if the drill pipe 120 becomes stuck. The pressure release associated with the dissolving of the dissolvable layer 125 may aid in further loosening up a stuck drill pipe 120. In addition, excess dissolving solution may act to chemically break-up or dissolve mud accumulated around the drill pipe 120. Excess dissolving solution may also be beneficial by acting to stimulate the matrix or formation. By selectively flowing dissolving fluid through the tunnels 146 in a sequential manner, (for example, through a first tunnel during a first stuck pipe incident, then through a second tunnel during a second stuck pipe incident, et cetera) the drill pipe 120 and dissolvable layer 125 of the present embodiments may allow operators to unstick pipes several times, without having to remove the drill pipe 120 from the borehole 18, and/or without having to deploy any special tooling downhole.

Elements of different implementations described may be combined to form other implementations not specifically set forth previously. Elements may be left out of the processes described without adversely affecting their operation or the operation of the system in general. Furthermore, various separate elements may be combined into one or more individual elements to perform the functions described in this specification.

Other implementations not specifically described in this specification are also within the scope of the following claims.

These and other features, aspects and advantages of the present invention will become better understood with reference to the following description and appended claims. The accompanying drawings, which are incorporated in and constitute a part of this specification, illustrate embodiments of the present disclosure and, together with the description, serve to explain the principles of the present embodiments.

CERTAIN DEFINITIONS

In order for the present disclosure to be more readily understood, certain terms are first defined below. Additional definitions for the following terms and other terms are set forth throughout the specification.

An apparatus, system, or method described herein as "comprising" one or more named elements or steps is open-ended, meaning that the named elements or steps are essential, but other elements or steps may be added within the scope of the apparatus, system, or method. To avoid prolixity, it is also understood that any apparatus, system, or method described as "comprising" (or which "comprises") one or more named elements or steps also describes the corresponding, more limited apparatus system, or method "consisting essentially of" (or which "consists essentially of") the same named elements or steps, meaning that the apparatus, system, or method includes the named essential elements or steps and may also include additional elements or steps that do not materially affect the basic and novel characteristic(s) of the system, apparatus, or method. It is also understood that any apparatus, system, or method described herein as "comprising" or "consisting essentially of" one or more named elements or steps also describes the corresponding, more limited, and closed-ended apparatus, system, or method "consisting of" (or "consists of") the named elements or steps to the exclusion of any other unnamed element or step. In any apparatus, system, or method disclosed herein, known or disclosed equivalents of any named essential element or step may be substituted for that element or step.

As used herein, the term "longitudinally" generally refers to the vertical direction, and may also refer to directions that are co-linear with or parallel to the centerlines 40 of the rotary dynamic system 40, drill pipe 28, or borehole 18. Angles that are defined relative to a longitudinal direction may include both negative and positive angles. For example, a 30-degree angle relative to the longitudinal direction may include both an angle that is rotated clockwise 30 degrees from the vertical direction (that is, a positive 30-degree angle) as well as an angle that is rotated counterclockwise 30 degrees from the vertical direction (that is, a negative 30-degree angle). The word "longitudinally" may be used interchangeably with the word "axially."

As used herein, the term "downhole environment" may describe locations within a borehole and may describe environmental conditions typically experienced within boreholes during operation.

As used herein, "a" or "an" with reference to a claim feature means "one or more," or "at least one."

As used herein, the term "substantially" refers to the qualitative condition of exhibiting total or near-total extent or degree of a characteristic or property of interest.

EQUIVALENTS

It is to be understood that while the disclosure has been described in conjunction with the detailed description thereof, the foregoing description is intended to illustrate and not limit the scope of the invention(s). Other aspects, advantages, and modifications are within the scope of the claims.

This written description uses examples to disclose the invention, including the best mode, and also to enable any person skilled in the art to practice the present embodiments, including making and using any devices or systems and performing any incorporated methods. The patentable scope of the present embodiments is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotary dynamic system comprising:
   a drill pipe;
   a first bearing coupled at a first axial end to the drill pipe;
   an outer sleeve coupled to a second axial end of the first bearing;
   a second bearing; and
   multiple sensors disposed on at least one of the outer sleeve, the first bearing, the second bearing and the drill pipe,
   wherein the outer sleeve rotates independently of the drill pipe,
   wherein the first bearing is couple to an axially top portion of the outer sleeve and the second bearing is coupled to an axially bottom portion of the outer sleeve,
   wherein the first bearing comprises a metallic ball bearing, and the second bearing comprises a ceramic roller bearing,
   wherein the second bearing comprises a ceramic material comprising at least one of silicon nitride (Si2N4), alumina ceramic comprising an alumina purity range from about 75% to about 99%, and yttria-stabilized zirconia (YSZ), and
   wherein the multiple sensors determine at least one of a rotational speed and a rotational location of the outer sleeve.

2. The system of claim 1, wherein at least a portion of the drill pipe is concentrically disposed within the outer sleeve.

3. The system of claim 1, wherein the outer sleeve is actively driven via at least one of an electric motor, at least one engagement mechanism coupling the outer sleeve to the drill pipe, and a plurality of one-way catches disposed between an inner race of the bearing and an outer race of the bearing.

4. The system of claim 1,
   wherein one or more of the multiple sensors comprise at least one of a strain gauge, a Hall sensor, and an RFID tag.

5. The system of claim 1, further comprising a cleaning solution unit comprising:
   a container for holding a cleaning solution;
   a nozzle connected to the container for spraying the cleaning solution; and
   a nozzle gate for exposing the nozzle when necessary.

6. The system of claim 1, further comprising at least one spiral notch disposed on a sleeve that wraps around the outer sleeve.

7. A downhole assembly comprising:
   an outer sleeve comprising a hollow cylindrical body;
   a drill pipe concentrically disposed within the outer sleeve;
   a first bearing coupled to both the outer sleeve and the drill pipe and allowing relative rotational movement therebetween;
   a second bearing; and
   multiple sensors disposed on at least one of the outer sleeve, the first bearing, the second and the drill pipe,
   wherein the outer sleeve prevents deposits from accumulating on an outer surface of the drill pipe,
   wherein the first bearing is couple to an axially top portion of the outer sleeve and the second bearing is coupled to an axially bottom portion of the outer sleeve,
   wherein the first bearing comprises a metallic ball bearing, and the second bearing comprises a ceramic roller bearing,
   wherein the second bearing comprises a ceramic material comprising at least one of silicon nitride (Si2N4), alumina ceramic comprising an alumina purity range from about 75% to about 99%, and yttria-stabilized zirconia (YSZ), and
   wherein the multiple sensors determine at least one of a rotational speed and a rotational location of the outer sleeve.

8. The assembly of claim 7, wherein the drill pipe is stationary while the outer sleeve rotates about the drill pipe.

9. The assembly of claim 7, wherein the outer sleeve is stationary while the drill pipe rotates within the outer sleeve.

10. The assembly of claim 9, wherein at least one drilling fluid is circulated though both the drill pipe and an annulus of a borehole in which the downhole assembly is disposed.

11. The assembly of claim 7, wherein the deposits include at least one of scaling, mineral deposits, hardened mud, and consolidated drilling fluid.

12. A method of reducing the incidence of stuck drill pipes comprising:
   deploying a rotary dynamic system in a downhole environment, the rotary dynamic system comprising:

a first bearing;
a first drill pipe coupled to a first end of the first bearing; and
an outer sleeve coupled to a second end of the first bearing;
initiating a drilling process, comprising:
rotating the first drill pipe and the outer sleeve; and
circulating drilling fluid in the downhole environment;
determining an angular speed of the outer sleeve;
accelerating the outer sleeve after determining the angular speed of the outer sleeve; and
stopping a drilling process,
wherein stopping the drilling process comprises stopping the first drill pipe from rotating while allowing the outer sleeve to continue to rotate,
wherein prior to accelerating the outer sleeve, the outer sleeve remains stationary for a predetermined period of time, and
wherein the predetermined period of time is from about thirty (30) seconds to about two (2) hours.

13. The method of claim 12, wherein the first bearing is coupled to a top axial end of the outer sleeve, and the rotary dynamic system further comprises a second bearing coupled to the bottom axial end of the outer sleeve.

* * * * *